United States Patent
Tapley et al.

(10) Patent No.: US 11,694,427 B2
(45) Date of Patent: *Jul. 4, 2023

(54) IDENTIFICATION OF ITEMS DEPICTED IN IMAGES

(71) Applicant: eBay Inc., San Jose, CA (US)

(72) Inventors: John Tapley, San Jose, CA (US); Eric J. Farraro, San Jose, CA (US); Raghav Gupta, Sunnyvale, CA (US); Roopnath Grandhi, Santa Clara, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/177,862

(22) Filed: Feb. 17, 2021

(65) Prior Publication Data

US 2021/0166061 A1    Jun. 3, 2021

Related U.S. Application Data

(63) Continuation of application No. 15/337,899, filed on Oct. 28, 2016, now Pat. No. 10,956,775, which is a
(Continued)

(51) Int. Cl.
*G06V 10/75* (2022.01)
*G06Q 30/06* (2012.01)
(Continued)

(52) U.S. Cl.
CPC ............ *G06V 10/56* (2022.01); *G06F 3/0484* (2013.01); *G06F 16/434* (2019.01);
(Continued)

(58) Field of Classification Search
CPC .. G06F 16/434; G06F 3/0484; G06F 16/5854; G06F 40/186; G06F 16/5838;
(Continued)

(56) References Cited

U.S. PATENT DOCUMENTS 3,675,215 A   7/1972   Arnold et al.
4,539,585 A   9/1985   Spackova et al.
(Continued)

FOREIGN PATENT DOCUMENTS

AU   2012212601 B2   5/2016
AU   2015264850 B2   4/2017
(Continued)

OTHER PUBLICATIONS

Non-Final Office Action received for U.S. Appl. No. 13/537,482, dated Jun. 28, 2017, 25 pages.
(Continued)

*Primary Examiner* — Nicholas Ulrich
(74) *Attorney, Agent, or Firm* — Holland & Hart LLP

(57) ABSTRACT

In an example embodiment, a method of identifying an item depicted in an image is provided. In this method, the image depicting the item is accessed; in addition, other images and their item identifiers are also accessed. A match of the image with one of the other images is identified. With a match, the image is then associated with an item identifier of the matched image.

20 Claims, 10 Drawing Sheets

Related U.S. Application Data continuation of application No. 12/371,882, filed on Feb. 16, 2009, now Pat. No. 9,495,386.

(60) Provisional application No. 61/106,916, filed on Oct. 20, 2008, provisional application No. 61/033,940, filed on Mar. 5, 2008.

(51) Int. Cl.
*G06F 3/0484* (2022.01)
*G06F 16/432* (2019.01)
*G06F 16/583* (2019.01)
*G06T 7/13* (2017.01)
*G06F 40/186* (2020.01)
*G06V 10/56* (2022.01)
*G06Q 30/0601* (2023.01)
*G06V 10/50* (2022.01)

(52) U.S. Cl.
CPC ...... *G06F 16/5838* (2019.01); *G06F 16/5854* (2019.01); *G06F 40/186* (2020.01); *G06Q 30/0601* (2013.01); *G06Q 30/0623* (2013.01); *G06T 7/13* (2017.01)

(58) Field of Classification Search
CPC ........... G06Q 30/0623; G06Q 30/0601; G06V 10/751; G06V 10/50; G06V 10/56; G06K 9/6202; G06K 9/6212; G06T 7/13
See application file for complete search history.

(56) References Cited

U.S. PATENT DOCUMENTS

| | | | |
|---|---|---|---|
| 4,596,144 A | 6/1986 | Panton et al. |
| 4,753,079 A | 6/1988 | Sumitomo |
| 5,068,723 A | 11/1991 | Dixit et al. |
| 5,408,417 A | 4/1995 | Wilder |
| 5,546,475 A | 8/1996 | Bolle et al. |
| 5,579,471 A | 11/1996 | Barber et al. |
| 5,633,678 A | 5/1997 | Parulski et al. |
| 5,692,012 A | 11/1997 | Virtamo et al. |
| 5,724,660 A | 3/1998 | Kauser et al. |
| 5,727,379 A | 3/1998 | Cohn |
| 5,732,354 A | 3/1998 | MacDonald |
| 5,781,899 A | 7/1998 | Hirata |
| 5,802,361 A | 9/1998 | Wang et al. |
| 5,818,964 A | 10/1998 | Itoh |
| 5,848,373 A | 12/1998 | DeLorme et al. |
| 5,870,149 A | 2/1999 | Comroe et al. |
| 5,889,896 A | 3/1999 | Meshinsky et al. |
| 5,890,068 A | 3/1999 | Fattouche et al. |
| 5,949,429 A | 9/1999 | Bonneau et al. |
| 6,069,570 A | 5/2000 | Herring |
| 6,091,956 A | 7/2000 | Hollenberg |
| 6,097,958 A | 8/2000 | Bergen |
| 6,112,226 A | 8/2000 | Weaver et al. |
| 6,134,548 A | 10/2000 | Gottsman et al. |
| 6,134,674 A | 10/2000 | Akasheh |
| 6,151,587 A | 11/2000 | Matthias |
| 6,154,738 A | 11/2000 | Call |
| 6,157,435 A | 12/2000 | Slater et al. |
| 6,157,841 A | 12/2000 | Bolduc et al. |
| 6,167,274 A | 12/2000 | Smith |
| 6,198,927 B1 | 3/2001 | Wright et al. |
| 6,204,812 B1 | 3/2001 | Fattouche |
| 6,208,297 B1 | 3/2001 | Fattouche et al. |
| 6,208,857 B1 | 3/2001 | Agre et al. |
| 6,216,134 B1 | 4/2001 | Heckerman et al. |
| 6,216,227 B1 | 4/2001 | Goldstein et al. |
| 6,243,588 B1 | 6/2001 | Koorapaty et al. |
| 6,246,861 B1 | 6/2001 | Messier et al. |
| 6,246,882 B1 | 6/2001 | Lachance |
| 6,259,381 B1 | 7/2001 | Small |
| 6,259,923 B1 | 7/2001 | Lim et al. |
| 6,266,014 B1 | 7/2001 | Fattouche et al. |
| 6,278,446 B1 | 8/2001 | Liou et al. |
| 6,292,593 B1 | 9/2001 | Nako et al. |
| 6,314,365 B1 | 11/2001 | Smith |
| 6,317,684 B1 | 11/2001 | Roeseler et al. |
| 6,330,452 B1 | 12/2001 | Fattouche et al. |
| 6,347,230 B2 | 2/2002 | Koshima et al. |
| 6,356,543 B2 | 3/2002 | Hall et al. |
| 6,404,388 B1 | 6/2002 | Sollenberger et al. |
| 6,341,255 B1 | 7/2002 | Lapidot |
| 6,424,840 B1 | 7/2002 | Fitch et al. |
| 6,434,530 B1 | 8/2002 | Sloane et al. |
| 6,456,852 B2 | 9/2002 | Bar et al. |
| 6,463,426 B1 | 10/2002 | Lipson et al. |
| 6,477,269 B1 | 11/2002 | Brechner |
| 6,477,363 B1 | 11/2002 | Ayoub et al. |
| 6,483,570 B1 | 11/2002 | Slater et al. |
| 6,484,130 B2 | 11/2002 | Dwyer et al. |
| 6,512,919 B2 | 1/2003 | Ogasawara |
| 6,519,463 B2 | 2/2003 | Tendler |
| 6,530,521 B1 | 3/2003 | Henry |
| 6,549,913 B1 | 4/2003 | Murakawa |
| 6,563,459 B2 | 5/2003 | Takenaga |
| 6,563,959 B1 | 5/2003 | Troyanker |
| 6,567,797 B1 | 5/2003 | Schuetze et al. |
| 6,577,946 B2 | 6/2003 | Myr |
| 6,580,914 B1 | 6/2003 | Smith |
| 6,587,835 B1 | 7/2003 | Treyz et al. |
| 6,589,290 B1 | 7/2003 | Maxwell et al. |
| 6,590,533 B2 | 7/2003 | Sollenberger et al. |
| 6,618,593 B1 | 9/2003 | Drutman et al. |
| 6,625,457 B1 | 9/2003 | Raith |
| 6,642,929 B1 | 11/2003 | Essafi et al. |
| 6,690,322 B2 | 2/2004 | Shamoto et al. |
| 6,714,797 B1 | 3/2004 | Rautila |
| 6,714,945 B1 | 3/2004 | Foote et al. |
| 6,724,930 B1 | 4/2004 | Kosaka et al. |
| 6,732,080 B1 | 5/2004 | Blants |
| 6,763,148 B1 | 7/2004 | Sternberg et al. |
| 6,783,148 B2 | 8/2004 | Henderson |
| 6,804,662 B1 | 10/2004 | Annau et al. |
| 6,807,479 B2 | 10/2004 | Watanabe et al. |
| 6,901,379 B1 | 5/2005 | Balter et al. |
| 6,947,571 B1 | 9/2005 | Rhoads et al. |
| 7,022,281 B1 | 4/2006 | Senft |
| 7,023,441 B2 | 4/2006 | Choi et al. |
| 7,062,722 B1 | 6/2006 | Carlin et al. |
| 7,082,365 B2 | 7/2006 | Sheha et al. |
| 7,092,702 B2 | 8/2006 | Cronin et al. |
| 7,130,466 B2 | 10/2006 | Seeber |
| 7,130,622 B2 | 10/2006 | Vanska et al. |
| 7,138,913 B2 | 11/2006 | Mackenzie et al. |
| 7,142,858 B2 | 11/2006 | Aoki et al. |
| 7,149,665 B2 | 12/2006 | Feld et al. |
| 7,162,082 B2 | 1/2007 | Edwards |
| 7,164,986 B2 | 1/2007 | Humphries et al. |
| 7,199,815 B2 | 4/2007 | Aoyama |
| 7,240,025 B2 | 7/2007 | Stone et al. |
| 7,254,388 B2 | 8/2007 | Nam et al. |
| 7,254,779 B1 | 8/2007 | Rezvani et al. |
| 7,257,268 B2 | 8/2007 | Eichhorn et al. |
| 7,273,172 B2 | 9/2007 | Olsen, III et al. |
| 7,281,018 B1 | 10/2007 | Begun et al. |
| 7,346,453 B2 | 3/2008 | Matsuoka |
| 7,346,543 B1 | 3/2008 | Edmark |
| 7,347,373 B2 | 3/2008 | Singh |
| 7,363,214 B2 | 4/2008 | Musgrove et al. |
| 7,363,252 B2 | 4/2008 | Fujimoto |
| 7,385,499 B2 | 6/2008 | Horton et al. |
| 7,460,735 B1 | 12/2008 | Rowley et al. |
| 7,478,143 B1 | 1/2009 | Friedman et al. |
| 7,495,674 B2 | 2/2009 | Biagiotti et al. |
| 7,502,133 B2 | 3/2009 | Fukunaga et al. |
| 7,519,562 B1 | 4/2009 | Vander et al. |
| 7,568,004 B2 | 7/2009 | Gottfried |
| 7,587,359 B2 | 9/2009 | Levy et al. |
| 7,593,602 B2 | 9/2009 | Stentiford |
| 7,669,759 B1 | 3/2010 | Zettner |
| 7,683,858 B2 | 3/2010 | Allen et al. |

(56) References Cited

U.S. PATENT DOCUMENTS

| | | |
|---|---|---|
| 7,702,185 B2 | 4/2010 | Keating et al. |
| 7,747,259 B2 | 6/2010 | Pande et al. |
| 7,752,082 B2 | 7/2010 | Calabria |
| 7,756,757 B1 | 7/2010 | Oakes, III |
| 7,761,339 B2 | 7/2010 | Alivandi |
| 7,761,340 B2 | 7/2010 | Yee et al. |
| 7,801,893 B2 | 9/2010 | Gulli et al. |
| 7,827,074 B1 | 11/2010 | Rolf |
| 7,848,764 B2 | 12/2010 | Riise et al. |
| 7,848,765 B2 | 12/2010 | Phillips et al. |
| 7,881,560 B2 | 2/2011 | John |
| 7,890,386 B1 | 2/2011 | Reber |
| 7,916,129 B2 | 3/2011 | Lin et al. |
| 7,921,040 B2 | 4/2011 | Reber |
| 7,933,811 B2 | 4/2011 | Reber |
| 7,948,481 B2 | 5/2011 | Vilcovsky |
| 7,957,510 B2 | 6/2011 | Denney et al. |
| 7,996,282 B1 | 8/2011 | Scott et al. |
| 8,078,498 B2 | 12/2011 | Edmark |
| 8,095,428 B2 | 1/2012 | Penagulur et al. |
| 8,098,894 B2 | 1/2012 | Soderstrom |
| 8,130,242 B2 | 3/2012 | Cohen |
| 8,131,118 B1 | 3/2012 | Jing et al. |
| 8,230,016 B1 | 7/2012 | Pattan et al. |
| 8,233,723 B2 | 7/2012 | Sundaresan |
| 8,239,130 B1 | 8/2012 | Upstill et al. |
| 8,260,846 B2 | 9/2012 | Lahav |
| 8,275,590 B2 | 9/2012 | Szymczyk et al. |
| 8,326,315 B2 | 12/2012 | Phillips et al. |
| 8,370,062 B1 | 2/2013 | Starenky et al. |
| 8,385,646 B2 | 2/2013 | Lang et al. |
| 8,411,977 B1 | 4/2013 | Baluja et al. |
| 8,421,872 B2 | 4/2013 | Neven, Sr. |
| 8,442,871 B2 | 5/2013 | Veres et al. |
| 8,547,401 B2 | 10/2013 | Mallinson et al. |
| 8,650,072 B2 | 2/2014 | Mason et al. |
| 8,811,957 B2 | 8/2014 | Jovicic et al. |
| 8,825,660 B2 | 9/2014 | Chittar |
| 8,868,443 B2 | 10/2014 | Yankovich et al. |
| 8,909,248 B2 | 12/2014 | Phillips et al. |
| 9,037,600 B1 | 5/2015 | Garrigues et al. |
| 9,058,764 B1 | 6/2015 | Persson et al. |
| 9,164,577 B2 | 10/2015 | Tapley et al. |
| 9,240,059 B2 | 1/2016 | Zises |
| 9,251,395 B1 | 2/2016 | Botchen |
| 9,336,541 B2 | 5/2016 | Pugazhendhi et al. |
| 9,449,342 B2 | 9/2016 | Sacco |
| 9,495,386 B2 | 11/2016 | Tapley et al. |
| 9,530,059 B2 | 12/2016 | Zises |
| 9,953,350 B2 | 4/2018 | Pugazhendhi et al. |
| 10,127,606 B2 | 11/2018 | Tapley et al. |
| 10,147,134 B2 | 12/2018 | Sacco |
| 10,210,659 B2 | 2/2019 | Tapley et al. |
| 10,846,766 B2 | 11/2020 | Govande et al. |
| 10,936,650 B2 | 3/2021 | Grandhi et al. |
| 10,956,775 B2 | 3/2021 | Tapley et al. |
| 2001/0034668 A1 | 10/2001 | Whitworth |
| 2001/0049636 A1 | 12/2001 | Hudda et al. |
| 2001/0055976 A1 | 12/2001 | Crouch et al. |
| 2002/0002504 A1 | 1/2002 | Engel et al. |
| 2002/0027694 A1 | 3/2002 | Kim et al. |
| 2002/0052709 A1 | 5/2002 | Akatsuka et al. |
| 2002/0072993 A1 | 6/2002 | Sandus et al. |
| 2002/0094189 A1 | 7/2002 | Navab et al. |
| 2002/0102967 A1 | 8/2002 | Chang et al. |
| 2002/0107737 A1 | 8/2002 | Kaneko et al. |
| 2002/0116286 A1 | 8/2002 | Walker et al. |
| 2002/0143930 A1 | 10/2002 | Babu et al. |
| 2002/0145984 A1 | 10/2002 | Babu et al. |
| 2002/0146176 A1 | 10/2002 | Meyers |
| 2002/0155844 A1 | 10/2002 | Rankin et al. |
| 2002/0196333 A1 | 12/2002 | Gorischek |
| 2003/0004802 A1 | 1/2003 | Callegari |
| 2003/0018652 A1 | 1/2003 | Heckerman et al. |
| 2003/0028873 A1 | 2/2003 | Lemmons |
| 2003/0051255 A1 | 3/2003 | Bulman et al. |
| 2003/0053706 A1 | 3/2003 | Hong et al. |
| 2003/0063128 A1 | 4/2003 | Salmimaa et al. |
| 2003/0065805 A1 | 4/2003 | Melvin |
| 2003/0080978 A1 | 5/2003 | Navab et al. |
| 2003/0085894 A1 | 5/2003 | Tatsumi |
| 2003/0098892 A1 | 5/2003 | Hiipakka |
| 2003/0101105 A1 | 5/2003 | Vock |
| 2003/0112260 A1 | 6/2003 | Gouzu |
| 2003/0123026 A1 | 7/2003 | Abitbol et al. |
| 2003/0125043 A1 | 7/2003 | Silvester |
| 2003/0126150 A1 | 7/2003 | Chan |
| 2003/0130787 A1 | 7/2003 | Clapper |
| 2003/0130910 A1 | 7/2003 | Pickover et al. |
| 2003/0134645 A1 | 7/2003 | Stern et al. |
| 2003/0139190 A1 | 7/2003 | Steelberg et al. |
| 2003/0147623 A1 | 8/2003 | Fletcher |
| 2003/0195044 A1 | 10/2003 | Narita |
| 2003/0197740 A1 | 10/2003 | Reponen |
| 2003/0208409 A1 | 11/2003 | Mault |
| 2003/0216960 A1 | 11/2003 | Postrel |
| 2003/0220835 A1 | 11/2003 | Barnes, Jr. |
| 2003/0229537 A1 | 12/2003 | Dunning et al. |
| 2003/0231806 A1 | 12/2003 | Troyanker |
| 2004/0002359 A1 | 1/2004 | Deas et al. |
| 2004/0019643 A1 | 1/2004 | Robert |
| 2004/0021567 A1 | 2/2004 | Dunn |
| 2004/0043773 A1 | 3/2004 | Lee et al. |
| 2004/0046779 A1 | 3/2004 | Asano et al. |
| 2004/0057627 A1 | 3/2004 | Abe et al. |
| 2004/0075670 A1 | 4/2004 | Bezine et al. |
| 2004/0096096 A1 | 5/2004 | Huber |
| 2004/0128320 A1* | 7/2004 | Grove ............... G06Q 30/08 |
| 2004/0133927 A1 | 7/2004 | Sternberg et al. |
| 2004/0144338 A1 | 7/2004 | Goldman |
| 2004/0153505 A1 | 8/2004 | Verdi et al. |
| 2004/0192339 A1 | 9/2004 | Wilson et al. |
| 2004/0192349 A1 | 9/2004 | Reilly |
| 2004/0203901 A1 | 10/2004 | Wilson et al. |
| 2004/0203931 A1 | 10/2004 | Karaoguz |
| 2004/0205286 A1 | 10/2004 | Bryant et al. |
| 2004/0220767 A1 | 11/2004 | Tanaka et al. |
| 2004/0220821 A1 | 11/2004 | Ericsson et al. |
| 2004/0230558 A1 | 11/2004 | Tokunaka |
| 2005/0001852 A1 | 1/2005 | Dengler et al. |
| 2005/0004850 A1 | 1/2005 | Gutbrod |
| 2005/0010486 A1 | 1/2005 | Pandhe |
| 2005/0015300 A1 | 1/2005 | Smith et al. |
| 2005/0065655 A1 | 3/2005 | Hong et al. |
| 2005/0081161 A1 | 4/2005 | Macinnes et al. |
| 2005/0084154 A1 | 4/2005 | Li et al. |
| 2005/0091597 A1 | 4/2005 | Ackley |
| 2005/0151743 A1 | 7/2005 | Sitrick |
| 2005/0151963 A1 | 7/2005 | Pulla et al. |
| 2005/0159883 A1 | 7/2005 | Humphries et al. |
| 2005/0162419 A1 | 7/2005 | Kim et al. |
| 2005/0162523 A1 | 7/2005 | Darrell et al. |
| 2005/0171864 A1 | 8/2005 | Nakade et al. |
| 2005/0182792 A1 | 8/2005 | Israel et al. |
| 2005/0193006 A1 | 9/2005 | Bandas |
| 2005/0222987 A1 | 10/2005 | Vadon |
| 2005/0240512 A1 | 10/2005 | Quintero et al. |
| 2005/0250516 A1 | 11/2005 | Shim |
| 2005/0278749 A1 | 12/2005 | Ewert et al. |
| 2005/0283379 A1 | 12/2005 | Reber |
| 2006/0004646 A1 | 1/2006 | Schoen et al. |
| 2006/0004850 A1 | 1/2006 | Chowdhury |
| 2006/0006238 A1 | 1/2006 | Singh |
| 2006/0012677 A1 | 1/2006 | Neven et al. |
| 2006/0013481 A1 | 1/2006 | Park et al. |
| 2006/0015492 A1 | 1/2006 | Keating et al. |
| 2006/0032916 A1 | 2/2006 | Mueller et al. |
| 2006/0038833 A1 | 2/2006 | Mallinson et al. |
| 2006/0047825 A1 | 3/2006 | Steenstra et al. |
| 2006/0058948 A1 | 3/2006 | Blass et al. |
| 2006/0059434 A1 | 3/2006 | Boss et al. |
| 2006/0064346 A1 | 3/2006 | Steenstra et al. |
| 2006/0071945 A1 | 4/2006 | Anabuki |
| 2006/0071946 A1 | 4/2006 | Anabuki et al. |

(56) References Cited

U.S. PATENT DOCUMENTS

| | | |
|---|---|---|
| 2006/0099959 A1 | 5/2006 | Staton et al. |
| 2006/0116935 A1 | 6/2006 | Evans |
| 2006/0120686 A1 | 6/2006 | Liebenow |
| 2006/0145837 A1 | 7/2006 | Horton et al. |
| 2006/0149625 A1 | 7/2006 | Koningstein |
| 2006/0149638 A1 | 7/2006 | Allen |
| 2006/0178782 A1 | 8/2006 | Pechtl et al. |
| 2006/0184013 A1 | 8/2006 | Emanuel et al. |
| 2006/0190293 A1 | 8/2006 | Richards |
| 2006/0195428 A1 | 8/2006 | Peckover |
| 2006/0211453 A1 | 9/2006 | Schick |
| 2006/0218153 A1 | 9/2006 | Voon et al. |
| 2006/0236257 A1 | 10/2006 | Othmer et al. |
| 2006/0240862 A1 | 10/2006 | Neven |
| 2006/0270421 A1 | 11/2006 | Phillips et al. |
| 2007/0005576 A1 | 1/2007 | Cutrell et al. |
| 2007/0015586 A1 | 1/2007 | Huston |
| 2007/0024469 A1 | 2/2007 | Chou |
| 2007/0038944 A1 | 2/2007 | Carignano et al. |
| 2007/0060112 A1 | 3/2007 | Reimer |
| 2007/0078846 A1 | 4/2007 | Gulli et al. |
| 2007/0091125 A1 | 4/2007 | Takemoto et al. |
| 2007/0098234 A1 | 5/2007 | Fiala |
| 2007/0100740 A1 | 5/2007 | Penagulur et al. |
| 2007/0104348 A1 | 5/2007 | Cohen |
| 2007/0122947 A1 | 5/2007 | Sakurai et al. |
| 2007/0133947 A1 | 6/2007 | Armitage et al. |
| 2007/0143082 A1 | 6/2007 | Degnan |
| 2007/0150403 A1 | 6/2007 | Mock |
| 2007/0159522 A1 | 7/2007 | Neven |
| 2007/0172155 A1 | 7/2007 | Guckenberger |
| 2007/0198505 A1 | 8/2007 | Fuller |
| 2007/0202844 A1 | 8/2007 | Wilson et al. |
| 2007/0230817 A1 | 10/2007 | Kokojima |
| 2007/0244633 A1 | 10/2007 | Phillips et al. |
| 2007/0244924 A1 | 10/2007 | Sadovsky et al. |
| 2007/0300161 A1 | 12/2007 | Bhatia et al. |
| 2008/0003966 A1 | 1/2008 | Magnusen |
| 2008/0005074 A1 | 1/2008 | Flake et al. |
| 2008/0035725 A1 | 2/2008 | Jambunathan et al. |
| 2008/0037877 A1 | 2/2008 | Jia et al. |
| 2008/0046738 A1 | 2/2008 | Galloway et al. |
| 2008/0046956 A1 | 2/2008 | Kulas |
| 2008/0059055 A1 | 3/2008 | Geelen et al. |
| 2008/0071559 A1 | 3/2008 | Arrasvuori |
| 2008/0074424 A1 | 3/2008 | Carignano |
| 2008/0082426 A1 | 4/2008 | Gokturk et al. |
| 2008/0084429 A1 | 4/2008 | Wissinger |
| 2008/0092551 A1 | 4/2008 | Skowronski |
| 2008/0104054 A1 | 5/2008 | Spangler |
| 2008/0109301 A1 | 5/2008 | Yee et al. |
| 2008/0126193 A1 | 5/2008 | Robinson |
| 2008/0126251 A1 | 5/2008 | Wassingbo |
| 2008/0127647 A1 | 6/2008 | Leitner |
| 2008/0142599 A1 | 6/2008 | Benillouche et al. |
| 2008/0151092 A1 | 6/2008 | Vilcovsky |
| 2008/0154710 A1 | 6/2008 | Varma |
| 2008/0163311 A1 | 7/2008 | St. John-Larkin |
| 2008/0163379 A1 | 7/2008 | Robinson et al. |
| 2008/0165032 A1 | 7/2008 | Lee |
| 2008/0170810 A1 | 7/2008 | Wu et al. |
| 2008/0176545 A1 | 7/2008 | Dicke et al. |
| 2008/0177640 A1 | 7/2008 | Gokturk et al. |
| 2008/0186226 A1 | 8/2008 | Ratnakar |
| 2008/0194323 A1 | 8/2008 | Merkli et al. |
| 2008/0201241 A1 | 8/2008 | Pecoraro |
| 2008/0205755 A1 | 8/2008 | Jackson et al. |
| 2008/0205764 A1 | 8/2008 | Iwai et al. |
| 2008/0207357 A1 | 8/2008 | Savarese et al. |
| 2008/0225123 A1 | 9/2008 | Osann et al. |
| 2008/0240575 A1 | 10/2008 | Panda et al. |
| 2008/0248815 A1 | 10/2008 | Busch |
| 2008/0255961 A1 | 10/2008 | Livesey |
| 2008/0267521 A1 | 10/2008 | Gao et al. |
| 2008/0268876 A1 | 10/2008 | Gelfand et al. |
| 2008/0278778 A1 | 11/2008 | Saino |
| 2008/0285940 A1 | 11/2008 | Kulas |
| 2008/0288338 A1* | 11/2008 | Wiseman ........... H04N 5/23206 705/14.69 |
| 2008/0288477 A1 | 11/2008 | Kim et al. |
| 2008/0313078 A1 | 12/2008 | Payne et al. |
| 2009/0006208 A1 | 1/2009 | Grewal et al. |
| 2009/0019487 A1 | 1/2009 | Kulas |
| 2009/0028435 A1 | 1/2009 | Wu et al. |
| 2009/0028446 A1 | 1/2009 | Wu et al. |
| 2009/0034260 A1 | 2/2009 | Ziemkowski et al. |
| 2009/0076925 A1 | 3/2009 | DeWitt et al. |
| 2009/0083096 A1 | 3/2009 | Cao et al. |
| 2009/0094260 A1* | 4/2009 | Cheng ................... G06Q 30/02 |
| 2009/0099951 A1 | 4/2009 | Pandurangan |
| 2009/0106127 A1 | 4/2009 | Purdy et al. |
| 2009/0109240 A1 | 4/2009 | Englert et al. |
| 2009/0110241 A1 | 4/2009 | Takemoto et al. |
| 2009/0141986 A1 | 6/2009 | Boncyk et al. |
| 2009/0144624 A1 | 6/2009 | Barnes |
| 2009/0148052 A1 | 6/2009 | Sundaresan |
| 2009/0182810 A1 | 7/2009 | Higgins et al. |
| 2009/0228342 A1 | 9/2009 | Walker et al. |
| 2009/0232354 A1 | 9/2009 | Camp et al. |
| 2009/0235181 A1 | 9/2009 | Saliba et al. |
| 2009/0235187 A1 | 9/2009 | Kim et al. |
| 2009/0240735 A1 | 9/2009 | Grandhi et al. |
| 2009/0245638 A1 | 10/2009 | Collier et al. |
| 2009/0262137 A1 | 10/2009 | Walker et al. |
| 2009/0271293 A1 | 10/2009 | Parkhurst et al. |
| 2009/0287587 A1 | 11/2009 | Bloebaum et al. |
| 2009/0299824 A1 | 12/2009 | Barnes, Jr. |
| 2009/0304267 A1 | 12/2009 | Tapley et al. |
| 2009/0319373 A1 | 12/2009 | Barrett |
| 2009/0319388 A1 | 12/2009 | Yuan et al. |
| 2009/0319887 A1 | 12/2009 | Waltman et al. |
| 2009/0324100 A1 | 12/2009 | Kletter et al. |
| 2009/0324137 A1 | 12/2009 | Stallings et al. |
| 2009/0325554 A1 | 12/2009 | Reber |
| 2010/0015960 A1 | 1/2010 | Reber |
| 2010/0015961 A1 | 1/2010 | Reber |
| 2010/0015962 A1 | 1/2010 | Reber |
| 2010/0034469 A1 | 2/2010 | Thorpe et al. |
| 2010/0037177 A1 | 2/2010 | Golsorkhi |
| 2010/0045701 A1 | 2/2010 | Scott et al. |
| 2010/0046842 A1 | 2/2010 | Conwell |
| 2010/0048290 A1 | 2/2010 | Baseley et al. |
| 2010/0049663 A1 | 2/2010 | Kane et al. |
| 2010/0070996 A1 | 3/2010 | Liao et al. |
| 2010/0082927 A1 | 4/2010 | Riou |
| 2010/0131714 A1 | 5/2010 | Chandrasekaran |
| 2010/0153378 A1 | 6/2010 | Sardesai |
| 2010/0161605 A1 | 6/2010 | Gabrilovich et al. |
| 2010/0171758 A1 | 7/2010 | Maassel et al. |
| 2010/0171999 A1 | 7/2010 | Namikata et al. |
| 2010/0185529 A1 | 7/2010 | Chesnut |
| 2010/0188510 A1 | 7/2010 | Yoo et al. |
| 2010/0198684 A1 | 8/2010 | Eraker et al. |
| 2010/0211900 A1 | 8/2010 | Fujioka |
| 2010/0214284 A1 | 8/2010 | Rieffel et al. |
| 2010/0235259 A1 | 9/2010 | Farraro et al. |
| 2010/0241650 A1 | 9/2010 | Chittar |
| 2010/0257024 A1 | 10/2010 | Holmes et al. |
| 2010/0260426 A1 | 10/2010 | Huang et al. |
| 2010/0281417 A1 | 11/2010 | Yolleck et al. |
| 2010/0287511 A1 | 11/2010 | Meier et al. |
| 2010/0289817 A1 | 11/2010 | Meier et al. |
| 2010/0293068 A1 | 11/2010 | Drakoulis et al. |
| 2010/0312596 A1 | 12/2010 | Saffari et al. |
| 2010/0316288 A1 | 12/2010 | Ip et al. |
| 2010/0332283 A1 | 12/2010 | Ng et al. |
| 2010/0332304 A1 | 12/2010 | Higgins et al. |
| 2011/0004517 A1 | 1/2011 | Soto et al. |
| 2011/0016487 A1 | 1/2011 | Chalozin et al. |
| 2011/0029334 A1 | 2/2011 | Reber |
| 2011/0047075 A1 | 2/2011 | Fourez |
| 2011/0053642 A1 | 3/2011 | Lee |
| 2011/0055054 A1 | 3/2011 | Glasson |
| 2011/0061011 A1 | 3/2011 | Hoguet |

(56) References Cited

U.S. PATENT DOCUMENTS

| | | |
|---|---|---|
| 2011/0065496 A1 | 3/2011 | Gagner et al. |
| 2011/0078305 A1 | 3/2011 | Varela |
| 2011/0084983 A1 | 4/2011 | Demaine |
| 2011/0090343 A1 | 4/2011 | Alt et al. |
| 2011/0128288 A1 | 6/2011 | Petrou et al. |
| 2011/0128300 A1 | 6/2011 | Gay et al. |
| 2011/0131241 A1 | 6/2011 | Petrou et al. |
| 2011/0143731 A1 | 6/2011 | Ramer et al. |
| 2011/0148924 A1 | 6/2011 | Tapley et al. |
| 2011/0153614 A1 | 6/2011 | Solomon |
| 2011/0173191 A1 | 7/2011 | Tsaparas et al. |
| 2011/0184780 A1 | 7/2011 | Alderson et al. |
| 2011/0187306 A1 | 8/2011 | Aarestrup et al. |
| 2011/0212717 A1 | 9/2011 | Rhoads et al. |
| 2011/0214082 A1 | 9/2011 | Osterhout et al. |
| 2011/0215138 A1 | 9/2011 | Crum |
| 2011/0238472 A1 | 9/2011 | Sunkada |
| 2011/0238476 A1 | 9/2011 | Carr et al. |
| 2011/0246064 A1 | 10/2011 | Nicholson |
| 2011/0277744 A1 | 11/2011 | Gordon et al. |
| 2011/0307338 A1 | 12/2011 | Carlson |
| 2011/0313874 A1 | 12/2011 | Hardie et al. |
| 2012/0072233 A1 | 3/2012 | Hanlon et al. |
| 2012/0084812 A1 | 4/2012 | Thompson et al. |
| 2012/0097151 A1 | 4/2012 | Matsuno et al. |
| 2012/0099800 A1 | 4/2012 | Llano et al. |
| 2012/0105475 A1 | 5/2012 | Tseng et al. |
| 2012/0113141 A1 | 5/2012 | Zimmerman et al. |
| 2012/0120113 A1 | 5/2012 | Hueso |
| 2012/0126974 A1 | 5/2012 | Phillips et al. |
| 2012/0129553 A1 | 5/2012 | Phillips et al. |
| 2012/0130796 A1 | 5/2012 | Busch |
| 2012/0150619 A1 | 6/2012 | Jacob et al. |
| 2012/0165046 A1 | 6/2012 | Rhoads et al. |
| 2012/0179716 A1 | 7/2012 | Takami |
| 2012/0185492 A1 | 7/2012 | Israel et al. |
| 2012/0192235 A1 | 7/2012 | Tapley et al. |
| 2012/0195464 A1 | 8/2012 | Ahn |
| 2012/0197764 A1 | 8/2012 | Nuzzi et al. |
| 2012/0215612 A1 | 8/2012 | Ramer et al. |
| 2012/0230581 A1 | 9/2012 | Miyashita et al. |
| 2012/0239483 A1 | 9/2012 | Yankovich et al. |
| 2012/0239501 A1 | 9/2012 | Yankovich et al. |
| 2012/0284105 A1 | 11/2012 | Li |
| 2012/0308077 A1 | 12/2012 | Tseng et al. |
| 2012/0323707 A1 | 12/2012 | Urban |
| 2012/0327115 A1 | 12/2012 | Chhetri et al. |
| 2013/0006735 A1 | 1/2013 | Koenigsberg et al. |
| 2013/0019177 A1 | 1/2013 | Schlossberg et al. |
| 2013/0036438 A1 | 2/2013 | Kutaragi et al. |
| 2013/0050218 A1 | 2/2013 | Beaver et al. |
| 2013/0073365 A1 | 3/2013 | McCarthy |
| 2013/0086029 A1 | 4/2013 | Hebert |
| 2013/0103306 A1 | 4/2013 | Uetake |
| 2013/0106910 A1 | 5/2013 | Sacco |
| 2013/0110624 A1 | 5/2013 | Mitrovic |
| 2013/0116922 A1 | 5/2013 | Cai et al. |
| 2013/0144701 A1 | 6/2013 | Kulasooriya et al. |
| 2013/0151366 A1 | 6/2013 | Godsey |
| 2013/0170697 A1 | 7/2013 | Zises |
| 2013/0198002 A1 | 8/2013 | Nuzzi et al. |
| 2013/0262231 A1 | 10/2013 | Glasgow et al. |
| 2013/0325839 A1 | 12/2013 | Goddard et al. |
| 2014/0000701 A1 | 1/2014 | Korevaar et al. |
| 2014/0007012 A1 | 1/2014 | Govande et al. |
| 2014/0085333 A1 | 3/2014 | Pugazhendhi et al. |
| 2014/0237352 A1 | 8/2014 | Sriganesh et al. |
| 2014/0372449 A1 | 12/2014 | Chittar |
| 2015/0006291 A1 | 1/2015 | Yankovich et al. |
| 2015/0032531 A1 | 1/2015 | Yankovich et al. |
| 2015/0052171 A1 | 2/2015 | Cheung |
| 2015/0065177 A1 | 3/2015 | Phillips et al. |
| 2015/0148078 A1 | 5/2015 | Phillips et al. |
| 2015/0163632 A1 | 6/2015 | Phillips et al. |
| 2016/0019723 A1 | 1/2016 | Tapley et al. |
| 2016/0034944 A1 | 2/2016 | Raab et al. |
| 2016/0117863 A1 | 4/2016 | Pugazhendhi et al. |
| 2016/0171305 A1 | 6/2016 | Zises |
| 2016/0364793 A1 | 12/2016 | Sacco |
| 2017/0046593 A1 | 2/2017 | Tapley et al. |
| 2017/0091975 A1 | 3/2017 | Zises |
| 2018/0124513 A1 | 5/2018 | Kim et al. |
| 2018/0189863 A1 | 7/2018 | Tapley et al. |
| 2018/0336734 A1 | 11/2018 | Tapley et al. |
| 2019/0266614 A1 | 8/2019 | Grandhi et al. |
| 2021/0027345 A1 | 1/2021 | Govande et al. |

FOREIGN PATENT DOCUMENTS

| | | |
|---|---|---|
| CN | 1255989 A | 6/2000 |
| CN | 1750001 A | 3/2006 |
| CN | 1802586 A | 7/2006 |
| CN | 1865809 A | 11/2006 |
| CN | 2881449 Y | 3/2007 |
| CN | 101153757 A | 4/2008 |
| CN | 101515195 A | 8/2009 |
| CN | 101515198 A | 8/2009 |
| CN | 101520904 A | 9/2009 |
| CN | 101541012 A | 9/2009 |
| CN | 101764973 A | 6/2010 |
| CN | 101772779 A | 7/2010 |
| CN | 101893935 A | 11/2010 |
| CN | 102084391 A | 6/2011 |
| CN | 102156810 A | 8/2011 |
| CN | 102194007 A | 9/2011 |
| CN | 102667913 A | 9/2012 |
| CN | 103443817 A | 12/2013 |
| CN | 104081379 A | 10/2014 |
| CN | 104656901 A | 5/2015 |
| CN | 105787764 A | 7/2016 |
| EP | 1365358 A2 | 11/2003 |
| EP | 1710717 A1 | 10/2006 |
| EP | 2015244 A1 | 1/2009 |
| EP | 2034433 A1 | 3/2009 |
| EP | 2499635 B1 | 10/2019 |
| GB | 2418275 A | 3/2006 |
| JP | 56-085650 A | 7/1981 |
| JP | 57-164286 A | 10/1982 |
| JP | 59-107144 A | 6/1984 |
| JP | 59-196956 A | 11/1984 |
| JP | 60-078250 A | 5/1985 |
| JP | 63-013113 B2 | 3/1988 |
| JP | 11191118 A | 7/1999 |
| JP | 2942851 B2 | 8/1999 |
| JP | 2000-110515 A | 4/2000 |
| JP | 2000-279944 A | 10/2000 |
| JP | 2001-283079 A | 10/2001 |
| JP | 2001-309323 A1 | 11/2001 |
| JP | 2001-344479 A | 12/2001 |
| JP | 2002-004943 A | 1/2002 |
| JP | 2002-099826 A | 4/2002 |
| JP | 2003-014316 A | 1/2003 |
| JP | 2003-022395 A | 1/2003 |
| JP | 2004-326229 A | 11/2004 |
| JP | 2005-337966 A | 12/2005 |
| JP | 2006-209658 A | 8/2006 |
| JP | 2006-351024 A | 12/2006 |
| JP | 3886045 B2 | 2/2007 |
| JP | 2007-172605 A | 7/2007 |
| JP | 3143216 U | 7/2008 |
| JP | 2010-039908 A | 2/2010 |
| JP | 2010-141371 A | 6/2010 |
| JP | 2010-524110 A | 7/2010 |
| JP | 2011-209934 A | 10/2011 |
| JP | 2012-529685 A | 11/2012 |
| KR | 10-2006-0126717 A | 12/2006 |
| KR | 10-2007-0014532 A | 2/2007 |
| KR | 10-0805607 B1 | 2/2008 |
| KR | 10-0856585 B1 | 9/2008 |
| KR | 10-2009-0056792 A | 6/2009 |
| KR | 10-2009-0070900 A | 7/2009 |
| KR | 10-2010-0067921 A | 6/2010 |
| KR | 10-2010-0071559 A | 6/2010 |
| KR | 10-2011-0082690 A | 7/2011 |

(56) References Cited

FOREIGN PATENT DOCUMENTS

| | | |
|---|---|---|
| WO | 99/04153 A1 | 1/1999 |
| WO | 1999/044153 A1 | 9/1999 |
| WO | 2001/022326 A1 | 3/2001 |
| WO | 2005/072157 A2 | 8/2005 |
| WO | 2005/072157 A3 | 2/2007 |
| WO | 2008/003966 A1 | 1/2008 |
| WO | 2008/051538 A2 | 5/2008 |
| WO | 2009/111047 A2 | 9/2009 |
| WO | 2009/111047 A3 | 12/2009 |
| WO | 2010/084585 A1 | 7/2010 |
| WO | 2010/141939 A1 | 12/2010 |
| WO | 2011/070871 A1 | 6/2011 |
| WO | 2011/087797 A2 | 7/2011 |
| WO | 2011/087797 A3 | 10/2011 |
| WO | 2012/106096 A1 | 8/2012 |
| WO | 2013/063299 A1 | 5/2013 |
| WO | 2013/101903 A2 | 7/2013 |
| WO | 2013/101903 A3 | 6/2014 |

OTHER PUBLICATIONS

Corrected Notice of Allowability Received for U.S. Appl. No. 15/337,899, dated Feb. 24, 2021, 2 Pages.
Non-Final Office Action received for U.S. Appl. No. 15/337,899 dated Feb. 5, 2020, 11 pages.
Notice of Allowance received for U.S. Appl. No. 15/337,899, dated Jul. 30, 2020, 7 pages.
Corrected Notice of Allowability received for U.S. Appl. No. 15/337,899, dated Sep. 10, 2020, 2 pages.
Notice of Allowance received for U.S. Appl. No. 15/337,899, dated Nov. 17, 2020, 7 Pages.
Klemperer,"Auctions: Theory and Practice", Princeton University Press, 2004, 15 pages.
Final Office Action Received for U.S. Appl. No. 15/337,899 dated Nov. 14, 2019, 20 pages.
First Action Interview—Office Action Summary received for U.S. Appl. No. 15/337,899, dated Jun. 25, 2019, 4 pages.
First Action Interview—Pre-Interview Communication received for U.S. Appl. No. 15/337,899, dated Mar. 19, 2019, 6 pages.
Communication Pursuant to Article 94(3) EPC received for European Patent Application No. 10803429.9, dated Aug. 30, 2018, 6 pages.
Corrected Notice of Allowance received for U.S. Appl. No. 14/868,105, dated Sep. 21, 2018, 9 pages.
Corrected Notice of Allowability received for U.S. Appl. No. 14/868,105, dated Oct. 11, 2018, 2 pages.
Office Action Received for Chinese Patent Application No. 201610108229.6 dated Nov. 15, 2018, 15 pages (6 pages Official Copy and 9 pages English Translation).
Final Office Action received for U.S. Appl. No. 13/537,482, dated Dec. 13, 2018, 18 pages.
Notice of Allowance Received For U.S. Appl. No. 12/398,957, dated Jan. 2, 2019, 10 pages.
Corrected Notice of Allowability Received for U.S. Appl. No. 14/868,105, dated Jan. 14, 2019, 2 pages.
Office Action received for Chinese patent Application No. 201610108229.6, dated May 17, 2019, 33 pages (20 pages of English Translation and 13 pages of Official copy).
Non-Final Office Action received for U.S. Appl. No. 13/537,482, dated Jun. 20, 2019, 22 pages.
Non-Final Office Action Received for U.S. Appl. No. 16/046,434, dated Aug. 21, 2019, 23 Pages.
Extended European Search Report Received for European Patent Application No. 19184977.7 dated Sep. 26, 2019, 10 pages.
Non-Final Office Action received for U.S. Appl. No. 12/398,957, dated Oct. 17, 2019, 11 pages.
Non-Final Office Action Received for U.S. Appl. No. 12/398,957, dated Dec. 9, 2019, 10 pages.
Office Action Received for Chinese Patent Application No. 201610108229.6, dated Dec. 17, 2019, 23 Pages (9 pages of Official Copy and 14 pages of English Translation).
Final Office Action Received for U.S. Appl. No. 13/537,482, dated Jan. 7, 2020, 25 Pages.
Final Office Action received for U.S. Appl. No. 16/046,434, dated Jan. 17, 2020, 24 pages.
Communication Pursuant to Article 94(3) EPC received For European Patent Application No. 17171025.4, dated Feb. 7, 2020, 6 pages.
Notice of Allowance received for U.S. Appl. No. 13/537,482, dated Apr. 8, 2020, 13 pages.
Final Office Action received for U.S. Appl. No. 12/398,957, dated Jun. 24, 2020, 17 pages.
Notice of Allowance received for U.S. Appl. No. 13/537,482, dated Jul. 13, 2020, 12 pages.
Notice of Allowance received for U.S. Appl. No. 12/398,957, dated Oct. 30, 2020, 8 pages.
Notice of Allowance Received for Korean Patent Application No. 10-2016-7025254 dated Mar. 9, 2018, 5 pages (2 pages of English Translation and 3 pages of Official Copy).
Kraft, "Real Time Baseball Augmented Reality Retrieved from the Internet URL: <http://dx.doi.org/10.7936/K7HH6H84>" 11 pages.
Gonsalves, Antone, "Amazon Launches Experimental Mobile Shopping Feature", Retrieved from the Internet <URL: http://www.informationweek.com/news/internet/retail/showArticle.jhtml?articleID=212201750&subSection=News Dec. 3, 2008, 1 page.
Terada, "New Cell Phone Services Tap Image-Recognition Technologies", Retrieved from the Internet: <URL: http://search.japantimes.co.jp/cgi-bin/nb20070626a1.html>, Jun. 26, 2007, pp. 1-3.
Troaca, "S60 Camera Phones Get Image Recognition Technology", http://news.softpedia.com/news/S60-Camera-Phones-Get-Image-Recognition-Technology-79666.shtml, Feb. 27, 2008, pp. 1-2.
"The ESP Game", Retrieved from the Internet: <URL: http://www.espgame.org/instructions.html>, Accessed on Nov. 13, 2007, 2 pages.
Mello Jr., "Pongr Giving Cell Phone Users Way to Make Money", Retrieved from the Internet URL; <https://www.pcworld.com/article/240209/pongr_giving_cell_phone_users_way_to_make_money.html>, Sep. 18, 2011, 2 pages.
Final Office Action received for U.S. Appl. No. 12/371,882, dated Mar. 13, 2013, 24 pages.
Non-Final Office Action received for U.S. Appl. No. 12/644,957, dated Mar. 18, 2013, 17 pages.
"SnapTell: Technology", Retrieved from the Internet: <URL: http://web.archive.org/web/20071117023817 /http:/ /www.snaptell.com/technology/index. htm>, Nov. 17, 2007, 1 page.
Final Office Action received for U.S. Appl. No. 12/371,882, dated Nov. 14, 2011, 21 pages.
Non-Final Office Action received for U.S. Appl. No. 12/371,882, dated Jun. 8, 2011, 22 pages.
Non-Final Office Action received for U.S. Appl. No. 12/398,957, dated Mar. 29, 2012, 23 pages.
Grandhi, Roopnath, et al., "Image Recognition as a Service", Application Serial No. 611033,940, Application filed Mar. 5, 2008, 56 pgs.
Ahn et al., et al., "Labeling Images with a Computer Game", Retrieved from the internet URL:<http://ael.gatech.edu/cs6452f13/files/2013/08/labeling-images.pdf>, 2004, 8 pages.
Occipitaihq, "RedLaser 2.0: Realtime iPhone UPC barcode scanning", Available online on URL: <https://www.youtube.com/watch?v=9_hFGsmx_6k>, Jun. 16, 2009, 1 pages.
Parker, J.R., et al., "Algorithms for Image Processing and Computer Vision", Wiley Computer Publishing, 1997, pp. 23-29.
Patterson, "Amazon Iphone App Takes Snapshots, Looks for a Match", Retrieved from the Internet: <URL: http://tech.yahoo.com/blogs/patterson/30983>,Dec. 3, 2008, 3 pages.
International Preliminary Report on Patentability received for PCT Application No. PCT/US2010/061628, dated Jul. 5, 2012, 6 pages.
Written Opinion received for PCT Application No. PCT/US2010/061628, dated Aug. 12, 2011, 4 pages.

(56) References Cited

OTHER PUBLICATIONS

Redlaser, "Redlaser—Impossibly Accurate Barcode Scanning", Retrieved from the Internet URL: <http://redlaser.com/index.php>, Jul. 8, 2011, pp. 1-2.
Non-Final Office Action received for U.S. Appl. No. 12/398,957, dated Sep. 19, 2013, 21 pages.
Final Office Action received for U.S. Appl. No. 12/644,957, dated Aug. 26, 2013, 19 pages.
Office Action received for Korean Patent Application No. 10-2012-7019181, dated Nov. 18, 2013, 11 pages.
Final Office Action received for U.S. Appl. No. 12/371,882, dated Dec. 18, 2013, 26 pages.
Non-Final Office Action received for U.S. Appl. No. 12/644,957, dated Mar. 7, 2014, 21 pages.
Office Action received for Chinese Patent Application No. 201080059424.5, dated Apr. 21, 2014, 18 pages.
Non-Final Office Action received for U.S. Appl. No. 13/537,482, dated Jan. 6, 2014, 25 pages.
Final Office Action received for U.S. Appl. No. 12/644,957, dated Jul. 11, 2014, 25 pages.
Office Action received for Korean Patent Application No. 10-2012-7019181, dated Jun. 26, 2014, 5 pages.
Office Action received for Korean Patent Application No. 10-2012-7019181, dated Nov. 3, 2014, 7 pages.
Non-Final Office Action received for U.S. Appl. No. 12/644,957, dated Dec. 29, 2014, 20 pages.
Examiner's Answer to Appeal Brief received for U.S. Appl. No. 12/398,957, dated Jan. 14, 2015, 10 pages.
Final Office Action received for U.S. Appl. No. 12/398,957, dated Jul. 18, 2014, 27 pages.
Final Office Action received for U.S. Appl. No. 13/537,482, dated May 8, 2014, 20 pages.
Final Office Action received for U.S. Appl. No. 13/537,482, dated May 22, 2015, 32 pages.
Non-Final Office Action received for U.S. Appl. No. 13/537,482, dated Nov. 6, 2014, 24 pages.
Kan, et al., "Applying QR Code in Augmented Reality Applications", pp. 253-258.
Notice of Allowance received for U.S. Appl. No. 12/644,957, dated Jun. 17, 2015, 20 pages.
Appeal Decision received for Korean Patent Application No. 10-2012-7019181, dated Jan. 29, 2016, 36 pages (46 pages of official copy and 20 pages of English translation).
Non-Final Office Action received for U.S. Appl. No. 12/371,882, dated Feb. 8, 2016, 37 pages.
Office Action received for Korean Patent Application No. 10-2012-7019181, dated Feb. 23, 2016, 12 pages (5 pages of English Translation and 7 pages of Official Copy).
Office Action received for Korean Patent Application No. 10-2014-7004160, dated Mar. 2, 2016, 7 pages (2 pages of English Translation and 5 pages of Official Copy).
Extended European Search report received for European Patent Application No. 10803429.9, dated Jun. 17, 2015, 7 pages.
Notice of Allowance received for U.S. Appl. No. 12/371,882, dated Jul. 20, 2016, 5 pages.
Notice of Allowance Received for Koean Patent Application No. 10-2014-7004160, dated Jun. 15, 2016, 8 pgs.
Definition of Homogeneous Coordinates, Retrieved from the internet URL: <https://web.archive.org/web/20110305185824/http://en.wikipedia.org/wiki/Homogeneous_coordinates>, 8 pages.
Vassilios, et al.,"Archeoguide:An Augmented Reality Guide for Archaeological Sites", IEEE Computer Graphics and application vol. 22, No. 5, Sep./Oct. 2002, pp. 52-60.
Communication Pursuant to Article 94(3) EPC received for European Patent Application No. 09717996.4, dated Jul. 23, 2013, 7 pages.
Extended European Search report received for European Patent Application No. 09717996.4, dated Feb. 17, 2011, 6 pages.
Office Action received for Korean Patent Application No. 10-2010-7022281, dated Feb. 28, 2012, 13 pgs.
Office Action received for Korean Patent Application No. 10-2010-7022281, dated Sep. 27, 2012, 12 pgs.
Trial Board Decision Filed on Mar. 25, 2014 For Korean Patent Application No. 10-2010-7022281, 21 pgs.
Appeal decision mailed for U.S. Appl. No. 12/398,957, dated Oct. 18, 2016, 7 pages.
Final Office Action received for U.S. Appl. No. 13/537,482, dated Nov. 7, 2016, 17 pages.
Non-Final Office Action received for U.S. Appl. No. 13/537,482, dated Jun. 24, 2016, 19 pages.
Decision of Reexamination received for Chinese Patent Application No. 200980107871.0, dated Nov. 30, 2015, 11 pages.
Office Action received for Chinese Patent Application No. 200980107871.0, dated Feb. 2, 2012, 17 pages.
Office Action received for Chinese Patent Application No. 200980107871.0, dated Jun. 5, 2014, 10 pages.
Office Action received for Chinese Patent Application No. 200980107871.0, dated May 3, 2013, 29 pages.
Office Action received for Chinese Patent Application No. 200980107871.0, dated Nov. 1, 2012, 13 pages.
Office Action received for Chinese Patent Application No. 200980107871.0, dated Nov. 5, 2013, 12 pages.
International Preliminary Report on Patentability received for PCT Application No. PCT/US2009/001419, dated Sep. 16, 2010, 5 pages.
International Search Report received for PCT Application No. PCT/US2009/001419, dated Sep. 30, 2009, 4 pages.
International Written Opinion received for PCT Application No. PCT/US2009/001419, dated Sep. 30, 2009, 4 pages.
Summons to Attend Oral Proceedings received for European Application No. 09717996.4, dated Nov. 28, 2016, 12 pages.
Non-Final Office Action received for U.S. Appl. No. 14/868,105, dated Dec. 12, 2016, 24 pages.
Office Action received for Korean Patent Application No. 10-2016-7025254, dated Oct. 13, 2016, 11 pages (6 pages of English Translation and 5 pages of Official copy).
Office Action received for Chinese Patent Application No. 201510088798.4, dated Mar. 17, 2017, 23 pages (14 pages of English Translation and 9 pages of Official Copy).
Final Office Action received for U.S. Appl. No. 14/868,105, dated Apr. 12, 2017, 22 pages.
Office Action received for Korean Patent Application No. 10-2016-7025254, dated May 2, 2017, 7 pages (3 pages of English Translation and 4 pages of Official Copy).
Non-Final Office Action received for U.S. Appl. No. 12/398,957, dated May 2, 2017, 19 pages.
Nalther, et al., "Selective Visual Attention Enables Learning and Recognition of Multiple Objects in Cluttered Scenes", Jun. 15, 2005, 23 pages.
First Examiner Report received for Indian Patent Application No. 6557/DELNP/2010, dated Apr. 11, 2017, 11 pages.
Office Action received for Korean Patent Application No. 10-2016-7025254, dated Sep. 5, 2017, 12 pages (5 pages of English Translation and 7 pages of Official Copy).
Non-Final Office Action received for U.S. Appl. No. 14/868,105, dated Nov. 14, 2017, 14 pages.
Final Office Action received for U.S. Appl. No. 13/537,482, dated Nov. 24, 2017, 19 pages.
Final Office Action received for U.S. Appl. No. 12/398,957, dated Jan. 22, 2018, 20 pages.
Araki, et al., "Follow-The-Trial-Fitter: Real-Time Dressing without Undressing", Retrieved from the Internet URL: https://dialog.proquest.com/professional/printviewfile?accountId=142257>, Dec. 1, 2008, 8 pages.
Final Office Action received for U.S. Appl. No. 12/371,882, dated Jun. 25, 2015, 27 pages.
Non-Final Office Action received for U.S. Appl. No. 12/371,882, dated Mar. 12, 2015, 29 pages.
Non-Final Office Action received for U.S. Appl. No. 12/371,882, dated Aug. 30, 2013, 20 pages.
Non-Final Office Action received for U.S. Appl. No. 12/371,882, dated Oct. 23, 2012, 21 pages.

(56) References Cited

OTHER PUBLICATIONS

Final Office Action received for U.S. Appl. No. 12/398,957, dated Nov. 7, 2012, 22 pages.
Non-Final Office Action received for U.S. Appl. No. 12/398,957, dated Jul. 29, 2011, 23 pages.
International Search Report received for PCT Application No. PCT/US2010/061628, dated Aug. 12, 2011, 4 pages.
Extended European Search Report received for European Patent Application No. 17171025.4, dated Sep. 4, 2017, 7 pages.
Non-Final Office Action Received for U.S. Appl. No. 13/537,482 dated May 16, 2018, 20 pages.
Notice of Allowance received for U.S. Appl. No. 14/868,105, dated May 21, 2018, 14 pages.
"Draw something", Retrieved from the Internet URL: <http://omgpop.com/drawsomething>, Accessed on Feb. 16, 2018, 2 pages.
Duke University, "How to Write Advertisements that Sell", Company: System, the magazine of Business, 1912, 66 pages.
Google Play, "AgingBooth", Retrieved from the Internet URL: <https://play.google.com/store/apps/details?id=com.piviandco.agingbooth&hl=en_IN>, Jan. 7, 2019, 3 pages.
Madeleine, "Terminator 3 Rise of Jesus! Deutsch", "Retrieved from the Internet URL: <https://www.youtube.com/watch?v:::Oj3o7HFcgzE>", Jun. 12, 2012, 2 pages.
Mlobitv,"MobiTV", Retrieved from the Internet: <URL: http://www.mobitv.com/>, Accessed on Mar. 30, 2015, 1 page.
Newby, "Facebook, Politico to measure sentiment of GOP candidates by collecting posts", 2006-2012 Clarity Digital Group LLC d/b/a Examiner.com, Jun. 28, 2012, 3 pages.
Sifry, "Politico-Facebook Sentiment Analysis Will Generate "Bogus" Results, Expert Says", Retrieved from the Internet: <http://techpresident.com/news/21618/politico-facebook-sentiment-analysis-bogus>, Jan. 13, 2012, pages.
Slingbox,"Sling Media, Inc.", Retrieved from the Internet: <URL: http://www.slingbox.com/>, Accessed on Mar. 30, 2015, 1 page.
"MLB At Bat",Retrieved from the Internet: <URL: http://texas.rangers.mlb.com/mobile/atbat/2c id=tex>, Accessed on Apr. 19, 2018, pp. 1-6.
Mulloni, et al., "Handheld Augmented Reality Indoor Navigation with Activity-Based Instructions", Proceedings of the 13th International Conference on Human Computer Interaction with Mobile Devices and Services, Aug. 30-Sep. 2, 2011, 10 pages.
Vlahakis, et al., "Archeoguide: First Results of an Augmented Reality, Mobile Computing System in Cultural Heritage Sites", Jan. 2001, 10 pages.
Wikipedia, "Polar Coordinate System", Wikipedia on Oct. 11, 2011 via Internet Archive WayBackMachine, [Online]., Oct. 8, 2011, 12 pages.
Non Final Office Action received for U.S. Appl. No. 17/039,443, dated Feb. 1, 2022, 20 pages.
About the Eclipse Foundation, Retrieved from Internet URL: <http://www.eclipse.org/org/>, Accessed on Nov. 2, 2021, 2 Pages.
Apache Tomcat, The Apache Software Foundation, Retrveied from Internet URL: <http://tomcat.apache.org/>, Accessed on Nov. 2, 2021, 4 Pages.
GOCR, open-source character recognition, Retrieved from Internet URL: <https://www-e.ovgu.de/jschulen/ocr/download.html>, Accessed on Nov. 3, 2021, 2 Pages.
Communication under Rule 71(3) for European Patent Application No. 10803429.9, dated Jun. 6, 2019, 8 pages.
Non-Final Office Action received for U.S. Appl. No. 16/406,787, dated Oct. 8, 2021, 12 Pages.
Oracle,"Java Technical Details", Retrieved from Internet URL: <https://www.oracle.com/java/technologies/>, Accessed on Nov. 3, 2021, 4 Pages.
Salesforce,"Custom Application Development Software for Business", Retrieved from internet URL: <https://www.salesforce.com/products/platform/overview/?d=70130000000liBh&internal=true>, Accessed on Oct. 4, 2021, 9 Pages.

W3C, "URIs, Addressability, and the use of HTTP GET and POST", Retrieved from Internet URL: <https://www.w3.org/2001/tag/doc/whenToUseGet.html>, Mar. 21, 2004, 9 Pages.
eBay Developers Program, Retrieved from the Internet URL: <https://developer.ebay.com/common/api/>, Accessed on Nov. 8, 2021, 3 Pages.
iPhone—Apple, Retrieved from the Internet URL: <http://www.apple.com/iphone/>, Accessed on Nov. 10, 2021, 12 pages.
WhatIs.Com, Retrieved from the Internet URL :<http://searchexchange.techtarget.com/sDefinition/0,,sid43_gci212805,00.html>, Accessed on Nov. 8, 2021, 5 pages.
DS Development SOFTWARE,"Email Protocols: IMAP, POP3, SMTP and HTTP", Retrieved from the Internet UR: :<http://www.emailaddressmanager.com/tips/protocol.html>, © 2004-2013 Digital Software Development, Accessed on Nov. 8, 2021, 1 Page.
W3C,"Extensible Markup Language (XML) 1.0 (Fourth Edition)", Retrieved from the Internet URL :<http://www.w3.org/TR/2006/REC-xml-20060816/#sec-origin-goals>, Aug. 16, 2006, 30 pages.
W3 Schools, "Introduction to XML", Retrieved from the Internet URL :<https://www.w3schools.com/xml/xml_whatis.asp>, Accessed on Nov. 8, 2021, 7 pages.
Gmail, Retrieved from Internet URL: https://www.gmail.com, Accessed on Nov. 10, 2021, 7 Pages.
Java Servlet Technology Overview, Retrieved from Internet URL: <https://www.oracle.com/java/technologies/servlet-technology.html>, Accessed on Nov. 10, 2021, 2 Pages.
Chinese Application Serial No. 200980107871.0, Notification of Reexamination dated Aug. 7, 2015, 22 pages (13 pages of Officiai Copy and 09 pages of English Translation).
Communication Pursuant to Article 94(3) EPC received for European Patent Application No. 10803429.9, dated Feb. 16, 2018, 8 pages.
Decision of Rejection Received for Chinese Patent Application No. 201610108229.6, dated Mar. 26, 2020, 11 pages (7 pages of Official Copy & 4 pages of English Translation of Claims).
Final Office Action received for U.S. Appl. No. 13/194,584, dated Jan. 22, 2016, 27 pages.
Final Office Action received for U.S. Appl. No. 13/194,584, dated Jul. 27, 2017, 35 pages.
Final Office Action received for U.S. Appl. No. 11/140,273, dated Dec. 13, 2007, 11 pages.
Final Office Action received for U.S. Appl. No. 11/140,273, dated Jul. 15, 2009, 11 pages.
Final Office Action received for U.S. Appl. No. 12/406,016, dated Feb. 29, 2012, 25 pages.
Final Office Action received for U.S. Appl. No. 13/194,584, dated Mar. 27, 2014, 22 pages.
Final Office Action received for U.S. Appl. No. 13/339,235, dated Jan. 13, 2014, 13 Pages.
Final Office Action received for U.S. Appl. No. 13/339,235, dated Aug. 29, 2012, 10 pages.
Final Office Action received for U.S. Appl. No. 13/339,235, dated Dec. 2, 2014, 7 pages.
Final Office Action received for U.S. Appl. No. 13/339,235, dated Jan. 27, 2017, 16 pages.
Final Office Action received for U.S. Appl. No. 14/512,350, dated Apr. 14, 2016, 23 pages.
Final Office Action received for U.S. Appl. No. 14/512,350, dated Aug. 23, 2017, 21 pages.
Final Office Action received for U.S. Appl. No. 141512,350, dated Nov. 30, 2015, 7 pages.
Final Office Action received for U.S. Appl. No. 17/039,443, dated Aug. 18, 2022, 12 pages.
Final Office Action received for U.S. Appl. No. 17/039,443, dated May 27, 2022, 17 pages.
Final Office Action received for U.S. Appl. No. 14/486,518, dated Nov. 16, 2017, 20 pages.
First Action Interview Office Action Summary received for U.S. Appl. No. 14/534,797, dated Feb. 18, 2016, 5 pages.
Geekery, "Proposal for Free, Open Source Cell Phone Location Service", Retrieved from the Internet URL: <//crud.blog/2004/03/06/proposal-for-free-open-source-cell-phone-location-service/>, Mar. 6, 2004, 8 pages.

(56) References Cited

OTHER PUBLICATIONS

Korean Application Serial No. 2012-7019181, Notice of Appeal filed Feb, 4, 2015, with English translation of claims, 24 pgs.
Non-Final Office Action received for U.S. Appl. No. 13/194,584, dated Jul. 16, 2015, 27 pages.
Non-Final Office Action received for U.S. Appl. No. 11/690,720, dated May 17, 2011, 11 pages.
Non-Final Office Action received for U.S. Appl. No. 13/361,196, dated Mar. 16, 2012, 10 pages.
Non-Final Office Action received for U.S. Appl. No. 13/361,196, dated Aug. 23, 2012, 13 pages.
Non-Final Office Action received for U.S. Appl. No. 15/250,588, dated Sep. 22, 2017, 16 pages.
Non-Final Office Action received for U.S. Appl. No. 11/140,273, dated Jul. 3, 2008, 11 pages.
Non-Final Office Action received for U.S. Appl. No. 11/140,273, dated May 31, 2007, 10 pages.
Non-Final Office Action received for U.S. Appl. No. 12/406,016, dated Jun. 21, 2011, 21 pages.
Non-Final Office Action received for U.S. Appl. No. 12/406,016, dated Oct. 2, 2013, 21 pages.
Non-Final Office Action received for U.S. Appl. No. 13/339,235, dated Aug. 18, 2014, 4 pages.
Non-Final Office Action received for U.S. Appl. No. 13/339,235, dated Aug. 28, 2017, 20 pages.
Non-Final Office Action received for U.S. Appl. No. 13/361,113, dated Feb. 13, 2014, 13 pages.
Non-Final Office Action received for U.S. Appl. No. 13/361,196, dated Mar. 29, 2012, 12 pages.
Non-Final Office Action received for U.S. Appl. No. 12/406,016, dated Mar. 11, 2016, 7 pages.
Notice of Allowability received for U.S. Appl. No. 12/406,016, dated Jun. 11, 2014, 19 pages.
Notice of Allowance received for U.S. Appl. No. 14/990,291, dated Dec. 13, 2017, 5 pages.
Notice of Allowance received for U.S. Appl. No. 13/339,235, dated Aug. 3, 2010, 6 pages.
Notice of Allowance received for U.S. Appl. No. 13/339,235, dated Apr. 25, 2014, 8 pages.
Notice of Allowance received for U.S. Appl. No. 17/039,443, dated Sep. 22, 2022, 10 pages.
Notification of Reexamination received for Chinese Patent Application No. 201610108229.6 dated May 9, 2022, 10 pages (2 pages English Translation, 8 pages Official Copy).
Office Action—First Action Interview received for No. U.S. Appl. No. 14/990,291, dated Oct. 18, 2017, 5 pages.
Preinterview First Office Action received for U.S. Appl. No. 14/990,291, dated Aug. 10, 2017, 4 pages.
U.S. Appl. No. 13/194,584, Non Final Office Action dated Sep. 19, 2013, 25 pgs.
U.S. Appl. No. 13/624,682, Non Final Office Action dated Jan. 22, 2015, 9 pgs.
U.S. Appl. No. 13/624,682, Notice of Allowance dated Jun. 8, 2015, 5 pgs.
U.S. Appl. No. 13/624,682, Notice of Allowance dated Oct. 1, 2015, 7 pgs.
U.S. Appl. No. 14/473,809, Non Final Office Action dated Aug. 13, 2015, 21 pgs.
Non-Final Office Action received for U.S. Appl. No. 16/406,787, dated Dec. 6, 2022, 11 pages.
Reexamination Decision received for Chinese Patent Application No. 201610108229.6 dated Nov. 4, 2022, 14 Pages (1 Page of English translation and 13 Pages of Official Copy).
Notice of Allowance received for U.S. Appl. No. 17/039,443, dated Jan. 26, 2023, 10 pages.

* cited by examiner

IDENTIFICATION OF ITEMS DEPICTED IN IMAGES

CROSS-REFERENCES TO RELATED APPLICATIONS

This application is a continuation of U.S. patent application Ser. No. 15/337,899, filed on Oct. 28, 2016, which application is a continuation of U.S. patent application Ser. No. 12/371,882, filed on Feb. 16, 2009, issued as U.S. Pat. No. 9,495,386, which claims the benefit of priority to U.S. Provisional Patent Application Ser. No. 61/106,916, filed Oct. 20, 2008, and U.S. Provisional Patent Application Ser. No. 61/033,940, filed Mar. 5, 2008, the benefit of priority of each of which is claimed hereby, and each of which are incorporated by reference herein in their entireties.

FIELD

The present disclosure relates generally to information retrieval. In an example embodiment, the disclosure relates to identification of items depicted in images.

BACKGROUND

Online shopping and auction websites provide a number of publishing, listing, and price-setting mechanisms whereby a seller may list or publish information concerning items for sale. A buyer can express interest in or indicate a desire to purchase such items by, for example, submitting a query to the website for use in a search of the requested items.

The accurate matching of a query to relevant items is currently a major challenge in the field of information retrieval. An example of such a challenge is that item descriptions tend to be short and are uniquely defined by the sellers. Buyers seeking to purchase the items might use a different vocabulary from the vocabulary used by the sellers to describe the items. As an example, an item identified in the title as a "garnet" does not match a query "January birthstone" submitted by a buyer, although garnet is known as the birthstone for January. As a result, online shopping and auction websites that use a conventional search engine to locate items may not effectively connect the buyers to the sellers and vice versa.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

The embodiments described herein provide techniques for identifying items depicted in images. Images depicting a variety of items are stored in a repository of, for example, a network-based publication system (e.g., an online shopping website and an online auction website). Users may submit these images for inclusion in item postings, advertisements, or other publications in the network-based publication system. As explained in more detail below, an item depicted in an image may be identified by matching the image with user submitted images stored in the repository. In some embodiments, as explained in more detail below, the match may be based on a comparison of the color histograms of the images.

Figure 1:
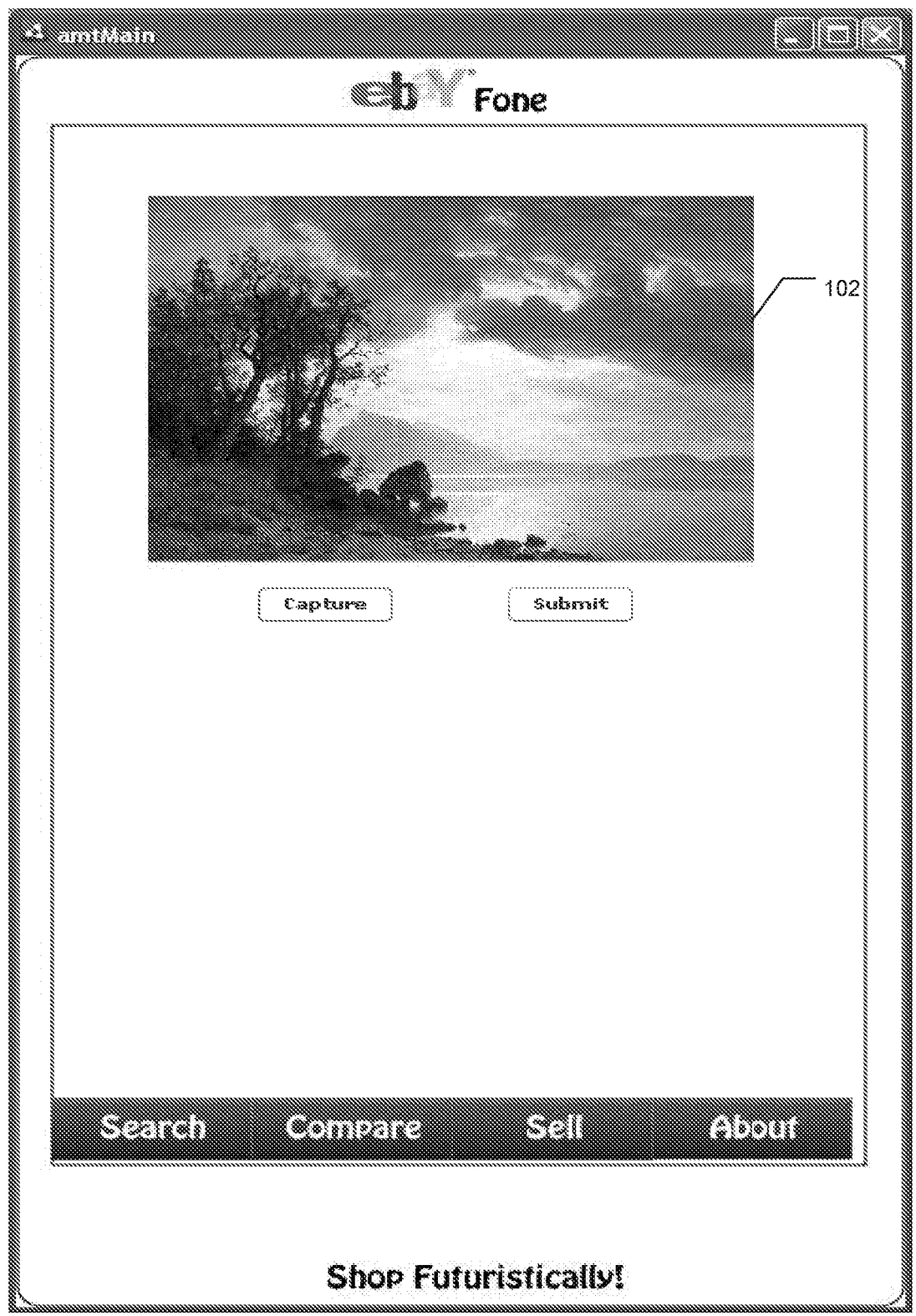
FIG. 1 is a user interface diagram showing an image that depicts an item, in accordance with an embodiment, that may be submitted for identification.
Figure 2:
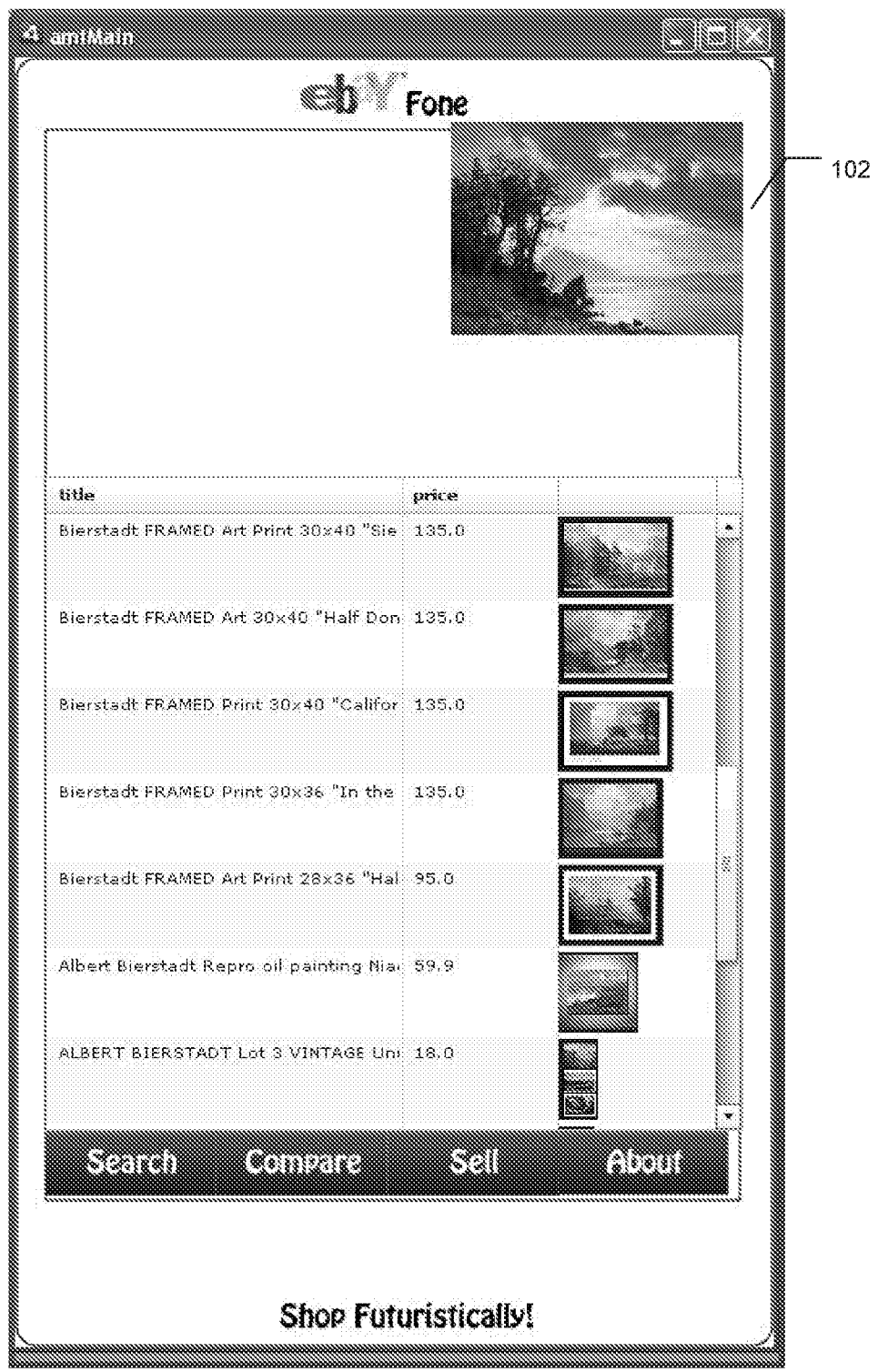
FIG. 2 is a user interface diagram showing a listing of items, in accordance with an embodiment, that match the item depicted in the image of FIG. 1.

FIG. 1 is a user interface diagram showing an image 102 that depicts an item, in accordance with an embodiment, that may be submitted for identification. As depicted, the image 102 is of a painting, and a user can shop for this painting by submitting this image 102 to, for example, an online shopping website. This online shopping website can identify the particular painting depicted in the image 102 and search its inventory for the identified painting. As depicted in FIG. 2, the online shopping website found several other paintings that match the painting depicted in the image 102 and lists these paintings for sale. As a result, rather than submitting the name or description of the painting depicted in the image 102, a user can simply submit the image 102 of the painting to, for example, the online shopping website for identification. The submission of the image 102 of the painting may therefore be faster because a user can effectively submit the painting for sale with just "one click" of a button instead of typing in a name or description of the painting. Furthermore, a user can locate the painting depicted in the image without even knowing the name of the painting. The submission process can also be more accurate because, for example, it does not depend on the user's knowledge of the painting's name, which can be erroneous.

It should be noted that the submission of an image of an item (e.g., image 102 of the painting) for identification may be used in a variety of different applications. As used herein, an "item" refers to any tangible or intangible thing and/or something that has a distinct, separate existence from other things (e.g., goods, services, electronic files, web pages, electronic documents, and land). For example, in addition to a sale of the item, a user may submit an image of the item to a price comparison service, in accordance with an embodiment of the invention. This price comparison service can identify the item depicted in the image and deliver shopping comparison results associated with the item. In another embodiment, a user can submit an image to a search engine (e.g., Internet search engine or website search engine) and the search engine can then retrieve websites or other information associated with the item depicted in the image. In yet another embodiment, a user can submit the image to an online auction website that can identify the item depicted in the image and return a template associated with the item to the user such that the user may then modify the template, if necessary, for use in auctioning the item on the online auction website. A template is an electronic file or document with descriptions and layout information. For example, a template may be a document with a predesigned, customized format and structure, such as a fax template, a letter template, or sale template, which can be readily filled in with information.

Figure 3:
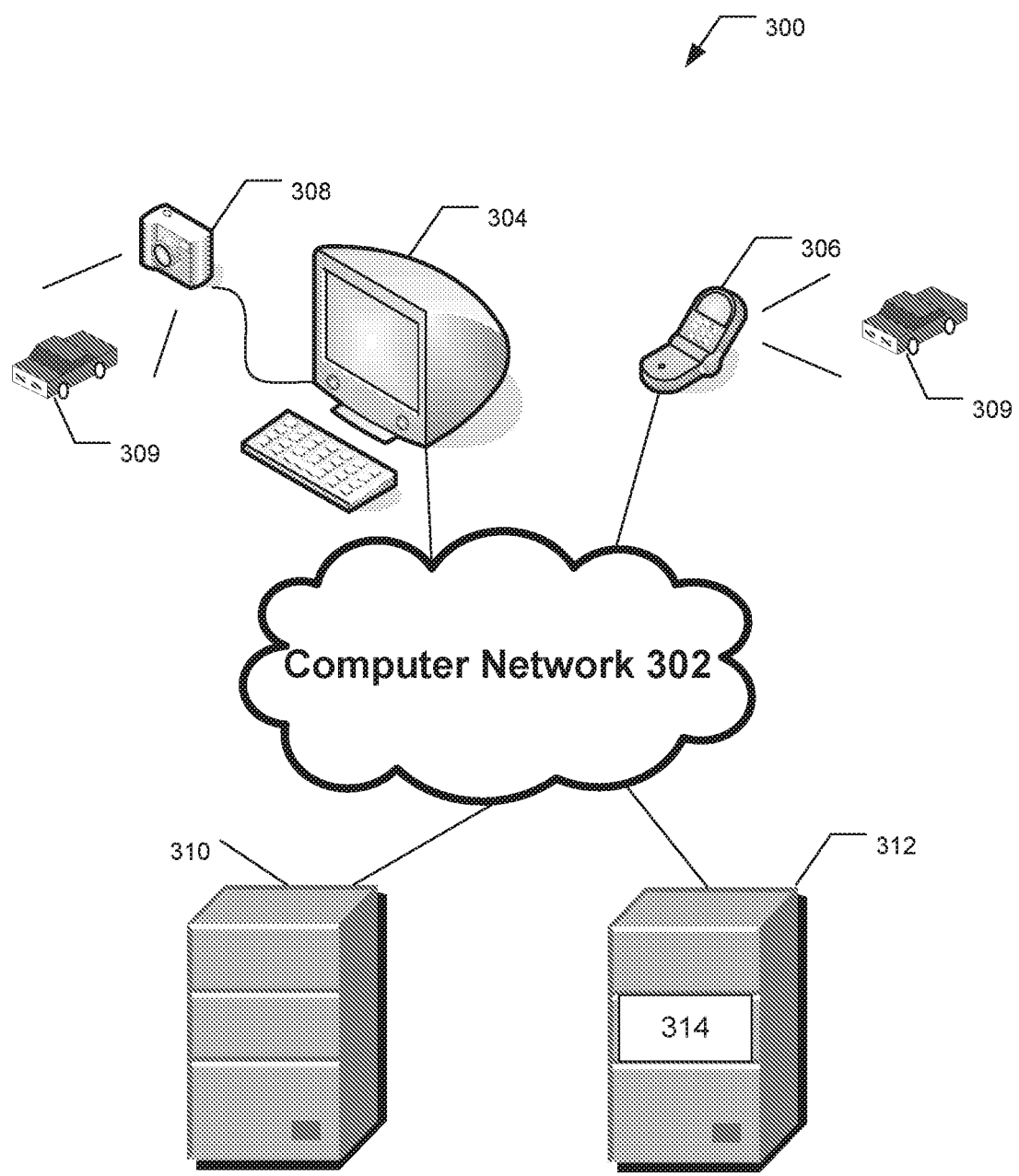
FIG. 3 is a diagram depicting a system, in accordance with an illustrative embodiment, for identifying items depicted in images.

FIG. 3 is a diagram depicting a system 300, in accordance with an illustrative embodiment, for identifying items depicted in images. As depicted, the system 300 includes client processing systems (e.g., personal computer 304 and mobile phone 306), a server 310 hosting a variety of services, and another server 312 hosting an item recognition module 314, which are all interconnected by way of a computer network 302. The computer network 302 is a collection of interconnected processing systems that communicate utilizing wired or wireless mediums. Examples of computer networks, such as the computer network 302, include Local Area Networks (LANs) and/or Wide-Area Networks (WANs), such as the Internet.

In the example of FIG. 3, a client processing system (e.g., personal computer 304 or mobile phone 306) transmits an image of an item 309 to the image recognition module 314, which is hosted on the server 312. The image may be captured by a camera built-in the mobile phone 306 or by a digital camera 308, which is configurable to download its stored images to the personal computer 304. Alternatively, the user may locate the image through, for example, the Internet or other image repositories.

The image recognition module 314 accesses the image from the client processing systems and, as explained in more detail below, identifies the item 309 depicted in the image with an item identifier. An "item identifier," as used herein, refers to a variety of values (e.g., alphanumeric characters and symbols) that establish the identity of or uniquely identify one or more items, such as item 309. For example, the item identifier can be a name assigned to the item 309. In another example, the item identifier can be a barcode value (e.g., Universal Product Code (UPC)) assigned to the item 309. In yet another example, the item identifier can be a title or description assigned to the item 309.

In an embodiment, the item recognition module 314 may then transmit the item identifier to a service hosted on the server 310 to locate item data. The "item data," as used herein, refer to a variety of data regarding one or more items depicted in an image that are posted or associated with the image. Such item data, for example, may be stored with the images or at other locations. Examples of item data include titles included in item listings, descriptions of items included in item listings, locations of the items, prices of the items, quantities of the items, availability of the items, a count of the items, templates associated with the items, and other item data. The type of item data requested by the item recognition module 314 depends on the type of service being accessed. Examples of services include online auction websites, online shopping websites, and Internet search engines (or website search engines). It should be appreciated that the item recognition module 314 may access a variety of different services by way of, for example, a Web-exposed application program interface (API). In an alternate embodiment, the item recognition module 314 may be embodied with the service itself where, for example, the item recognition module 314 may be hosted in the server 310 with the other services.

The system 300 may also include a global positioning system (not shown) that may be attached to or included in the client processing systems. The client processing systems can transmit the coordinates or location identified by the global positioning system to the services hosted on server 310 and, for example, the services can use the coordinates to locate nearby stores that sell the item 309 depicted in the image.

Figure 4:
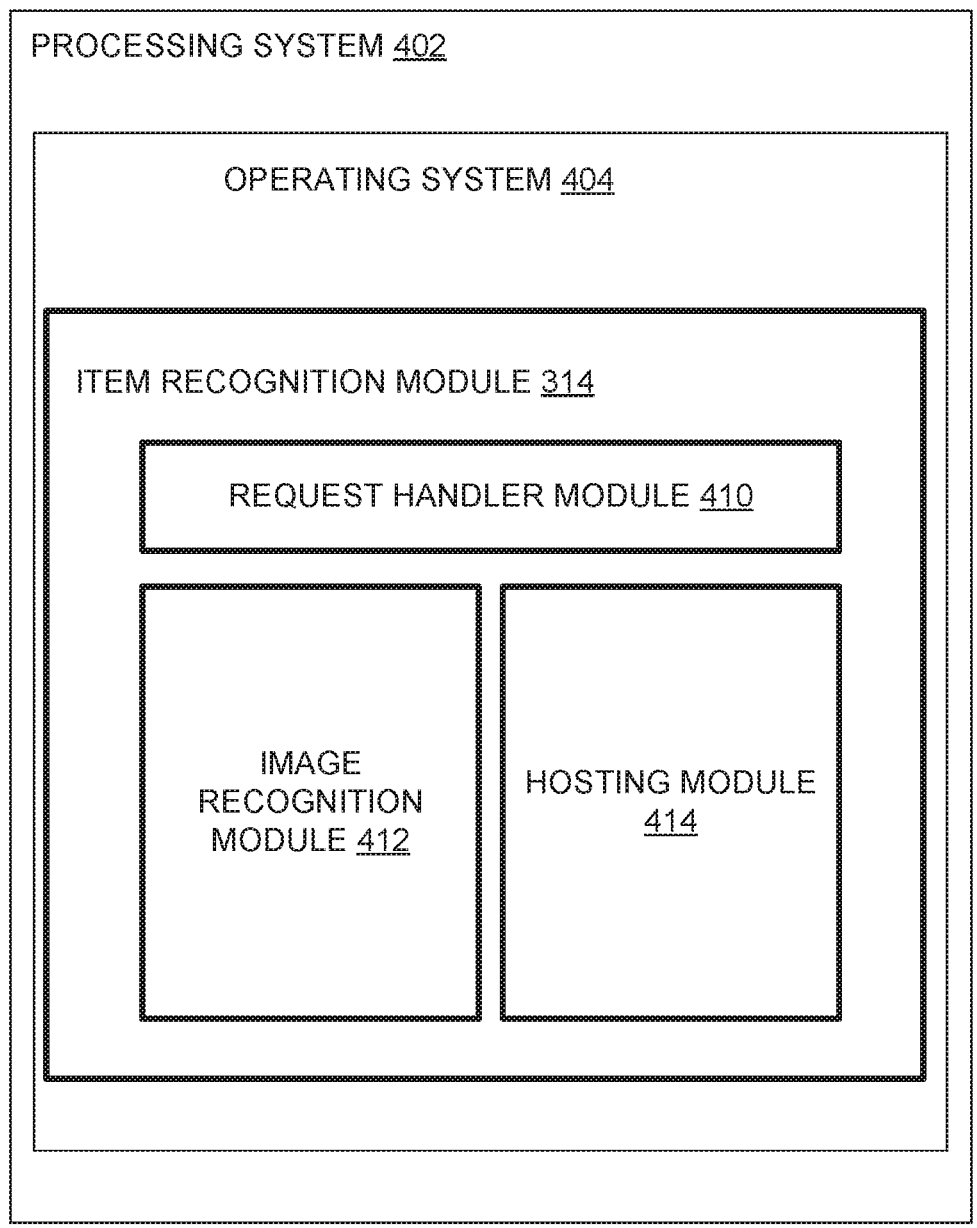
FIG. 4 is a block diagram depicting an item recognition module, in accordance with an illustrative embodiment, included in a processing system that is configured to identify items depicted in images.

FIG. 4 is a block diagram depicting an item recognition module 314, in accordance with an illustrative embodiment, included in a processing system 402 that is configured to identify items depicted in images. It should be appreciated that the processing system 402 may be deployed in the form of variety of computing devices, such as personal computers, laptop computers, server computers, and other computing devices. For example, the processing system 402 may be the server 310 or 312 or the personal computer 304 depicted in FIG. 3. In various embodiments, the processing system 402 may be used to implement computer programs, logic, applications, methods, processes, or other software to identify items depicted in images, as described in more detail below.

The processing system 402 is configured to execute an operating system 404 that manages the software processes and/or services executing on the processing system 402. As depicted in FIG. 4, these software processes and/or services include the item recognition module 314. Generally, the item recognition module 314 is configured to identify one or more items depicted in an image. The item recognition module 314 may include a request handler module 410, an image recognition module 412, and a hosting module 414.

The request handler module 410 is configured to interface with other processing systems, such as the client processing systems 304 and 306 of FIG. 3. The interface may include the receipt of messages and data from other processing systems by way of Hypertext Transfer Protocol (or other protocols), and also include transmission of messages and data from the item recognition module 314 to other processing systems by way of Hypertext Transfer Protocol. Referring to FIG. 4, another processing system in communication with the item recognition module 314 may convert an image into a byte array and open a remote Hypertext Transfer Protocol (HTTP) request to the item recognition module 314. The byte array is written to a server socket using, for example, HTTP POST, and a separate HTTP GET request may be sent, including global positioning system coordinates of the processing system, if available. The request handler module 410 receives the byte array and converts it into, for example, a Java image object that is then processed by the image recognition module 412.

The image recognition module 412 is configured to identify one or more items depicted in an image by comparing the received image with other images of items to identify a match, which is explained in more detail below. The hosting module 414 is configured to interface with other services, which are discussed above. As an example, the image recognition module 412 may transmit a request to a service by way of the hosting module 414 for item data associated with the identified items. This request may include an item identifier, global positioning coordinates, and other information. In turn, the item recognition module 314 receives the requested item data from the service by way of the hosting module 414. The request handler module 410 may then parse the item data from the service into, for example, a lightweight eXtensible Markup Language (XML) for mobile devices and may transmit the response back to the processing systems that originally requested the item data regarding the items depicted in the image.

It should be appreciated that in other embodiments, the processing system 402 may include fewer, more, or different modules apart from those shown in FIG. 4. For example, the image recognition module 412 may be further split into an image recognition module and a neural network module, which are explained in more detail below.

Figure 5:
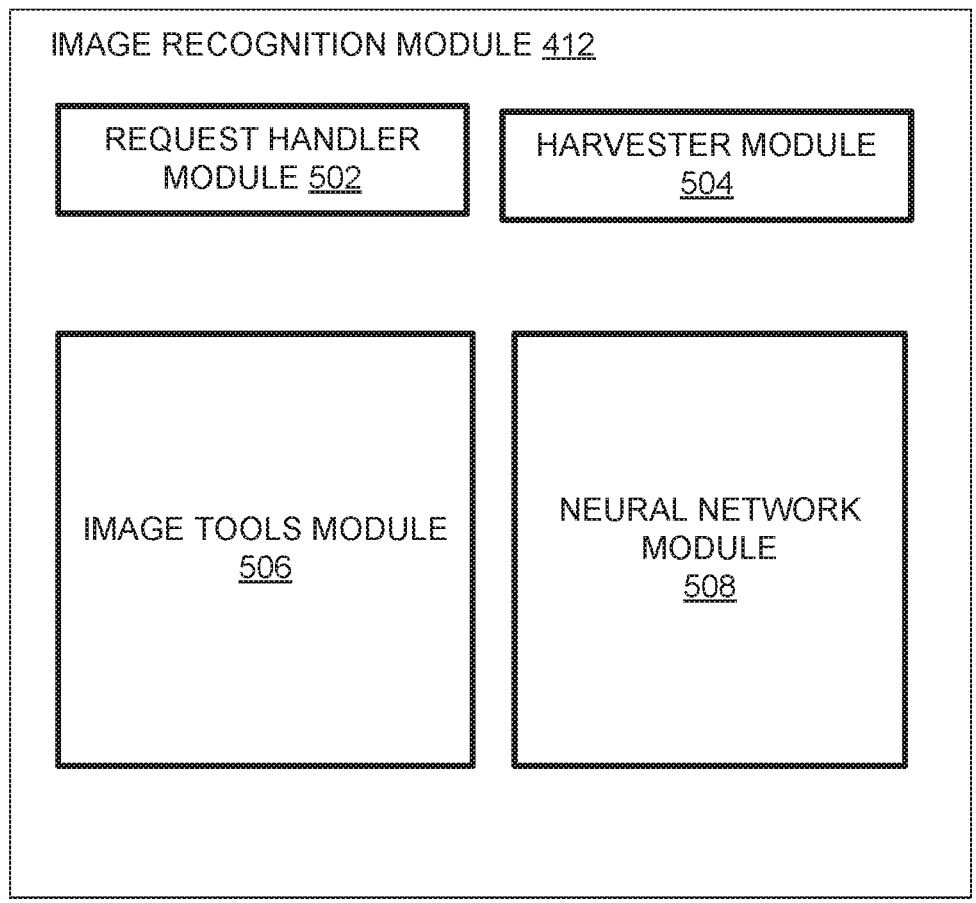
FIG. 5 is a block diagram depicting modules, in accordance with an embodiment, included in the image recognition module.

FIG. 5 is a block diagram depicting modules 502, 504, 506, and 508, in accordance with an embodiment, included in the image recognition module 412. As depicted, the image recognition module 412 includes another request handler module 502, a harvester module 504, an image tools module 506, and a neural network module 508. In general, this other request handler module 502 is configured to process requests made to the image recognition module 412. The image tools module 506 is configured to process the images using one or more image processing algorithms, such as an edge detection algorithm, which is described in more detail below.

Generally, the neural network module 508 is configured to identify one or more items depicted in an image through learning and training. As an example, the neural network module 508 can identify matches between images based on learning algorithms. It should be appreciated that a neural network is a type of computer system that is based generally on the parallel architecture of animal brains and can learn by example. As explained in more detail below, the neural network module 508 gathers representative data and then invokes learning algorithms to learn automatically the structure of the data. A Java Object Oriented Neural Engine is an example of a neural network module 508. Other examples of neural network modules include Feed Forward Neural Networks, Recursive Neural Networks (e.g., Elman and Jordan), Time Delay Neural Networks, Standard Back-Propagation Neural Networks (e.g., Gradient Descent, on-line, and batch), Resilient Back-Propagation (RPROP) Neural Networks, Kohonen Self-Organizing Maps (with WTA or Gaussian output maps), Principal Component Analysis, and Module Neural Networks.

The harvester module 504 is configured to request item data from a service by way of, for example, an API. As described in more detail below, the harvester module 504 may then parse the item data to identify item identifiers and associate the item identifiers with an image.

Figure 6:
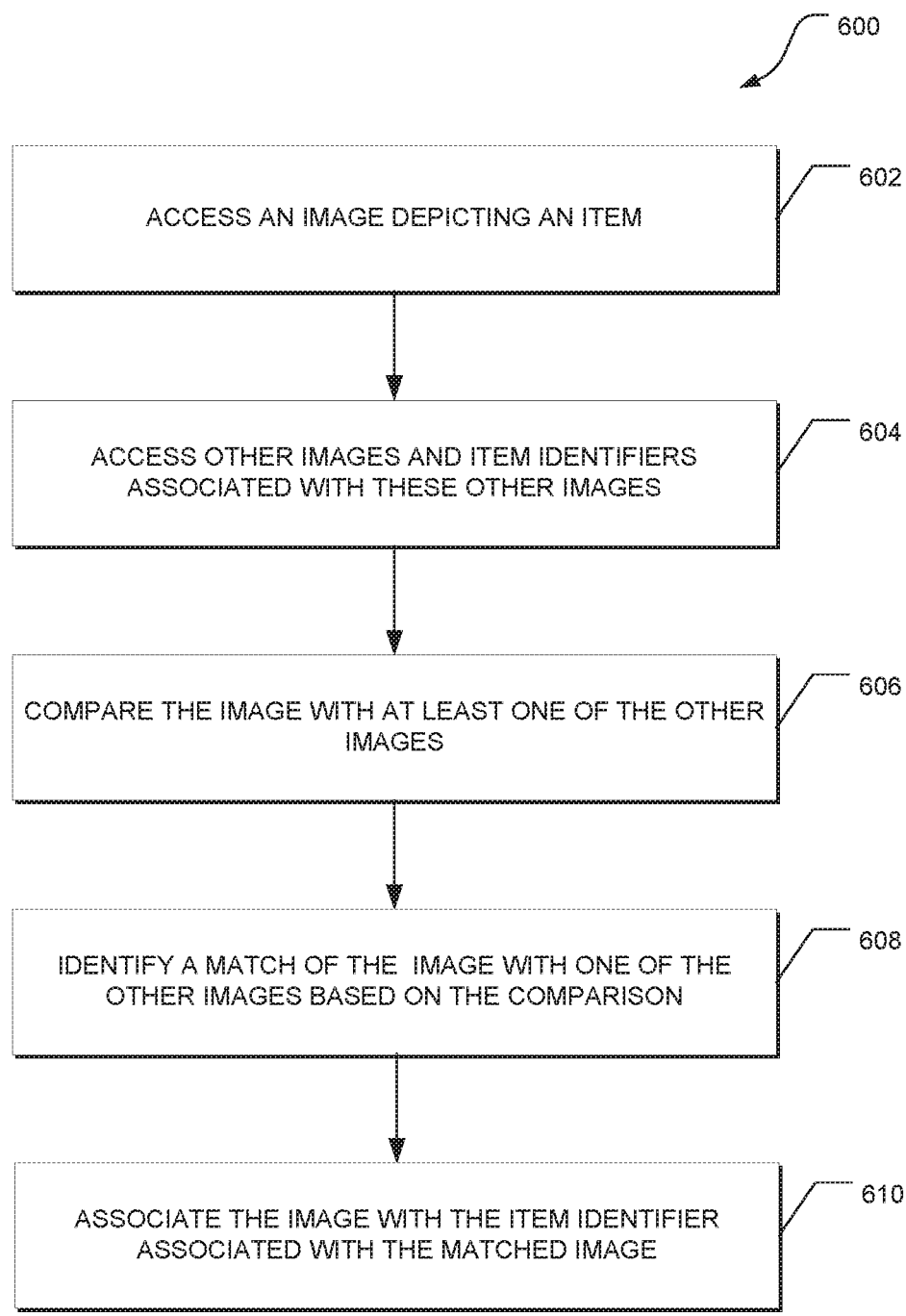
FIG. 6 is a flow diagram depicting a general overview of a method, in accordance with an embodiment, for identifying an item depicted in an image.

FIG. 6 is a flow diagram depicting a general overview of a method 600, in accordance with an embodiment, for identifying an item depicted in an image. In an embodiment, the method 600 may be implemented by the item recognition module 314 and employed in the processing system 402 of FIG. 4. As depicted in FIG. 6, an image depicting an item is accessed at 602. This image may be submitted by a user to identify the item depicted in the image. Additionally, one or more other images and their associated item identifiers, which identify the items depicted in these other images, are accessed at 604. These images and item identifiers may be from user-submitted item postings and are stored in and accessed from a repository of, for example, a network-based publication system. For example, a large number of users place or sell items on an auction website and, when placing or selling these items, the users would submit images and descriptions of the items. All these images and their descriptions, which may be used as item identifiers, may be stored in the repository and are accessible by the item recognition module.

A variety of image identification techniques may be applied to identify the item depicted in the image. As an example, the identification can be based on identifying a match of the image with one of the other images accessed from the repository. In this embodiment, the image is compared with other images at 606, and a match of the image with at least one of the other images is identified at 608 based on the comparison. Once a match is identified, the item identifier associated with the matched image is accessed and the submitted image is associated with the item identifier at 610. Since the item identifier identifies the item depicted in the image, the association effectively results in the identification of the item depicted in the image.

It should be appreciated that a single image may also include multiple items. Each item may be automatically identified or, to assist in the identification, a user may manually point to or designate an approximate location or region of each item in the image as separate items, and the item recognition module can then focus on each designated location to identify a particular item. As a result, for example, if a user wants to list several items for sale, the user can simply take a single picture of all the items and submit the picture in the form of an image to a listing service. The listing service with the item recognition module may then automatically identify and list all the items in the submitted image for sale.

Figure 7:
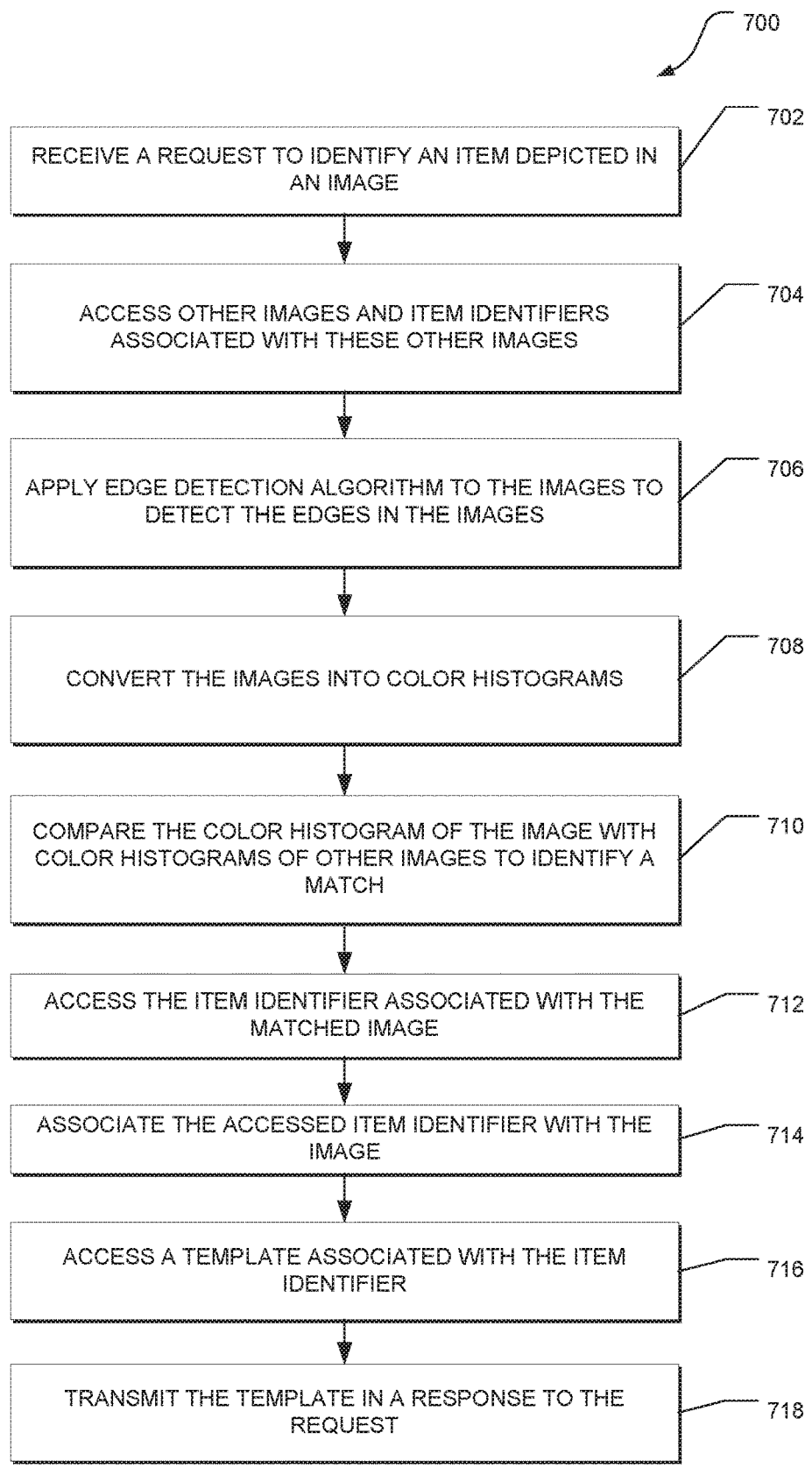
FIG. 7 is a flow diagram depicting a detailed method, in accordance with some embodiments, for identifying an item depicted in an image.

FIG. 7 is a flow diagram depicting a detailed method 700, in accordance with another embodiment, for identifying an item depicted in an image. In the method 700, a request is received to identify an item depicted in an image at 702. This request may, for example, be received from a client processing system and includes an image submitted by a user. Additionally, one or more other images and their associated item identifiers are accessed at 704 from, for example, a repository of a network-based publication system.

In an embodiment, to enhance the accuracy of the subsequent item identification, a variety of different image algorithms can be applied to the images. An example is the application of an edge detection algorithm to the images at 706, in accordance with an alternative embodiment, to detect edges in the images. An image tool module included in the item recognition module, as discussed above, may apply an edge detection algorithm to detect, draw, enhance, or highlight lines, areas, or points of contrast in the image. An example is the application of a Canny edge detector algorithm to extrapolate contrasts of the images. The contrasts effectively serve to highlight the lines, points, or areas that define the item, and the detection of these lines, points, or areas increases the probability of identifying a match between two or more images. Other examples of image algorithms that may be applied to the images include Marching Squares Algorithm and Haar wavelet.

The identification of items depicted in the image can be based on identifying a match of the image with at least one of the other images accessed from the repository. In an embodiment, at 708, the images being compared are converted into color histograms, which are representations of distributions of colors in the images. The color histogram of the image is then compared with the color histograms of the other images at 710 to identify a match. As an example, a neural network module compares the color histograms to generate a statistical analysis of the comparison. The statistical analysis may identify a statistical difference or a statistical similarity between the compared color histograms, and the match is based on the resulting statistical analysis.

The neural network module may then return a set of statistical analysis and associated item identifiers assigned to each set of comparisons. As an example, item identifiers can be correlated with statistical differences using name value pairs, such as "DVD player: 0.00040040." Here, the item identifier with the smallest correlated error may be the best match based, in part, on training data. As discussed previously, the neural network module can learn from training using examples from previous comparisons. As an example, if a match is identified, the image and its item identifier identified from the match may be warehoused or stored with a large group of images for training the neural network module to make the identification of items more accurate. In another example, a user can manually confirm that a particular item as depicted in an image is accurate, and this confirmation may also be used to develop training for the neural network module.

Once a match is identified, the item identifier associated with the matched image is accessed at 712 and associated with the image being submitted at 714. In the example above, if the item identifier "DVD player" is associated with the matched image from the repository, then the "DVD player" is associated with the image being submitted. It should be appreciated that in addition to the application of the edge detector algorithm and the comparison with other images as discussed above, other image identification processes may also be applied to identify items depicted in the image, in accordance with other embodiments of the invention.

Still referring to FIG. 7, a template associated with the item identifier is accessed at 716, in accordance with an embodiment of the invention. The template may be a prebuilt template stored in a data structure and associated with a particular item or item identifier. For example, this template may already include descriptions and attributes of an associated item. The template is then transmitted at 718 in a response to the request. As an example, the template is included in a response and this response is transmitted back to the client processing system that initially requested the identification.

Figure 8:
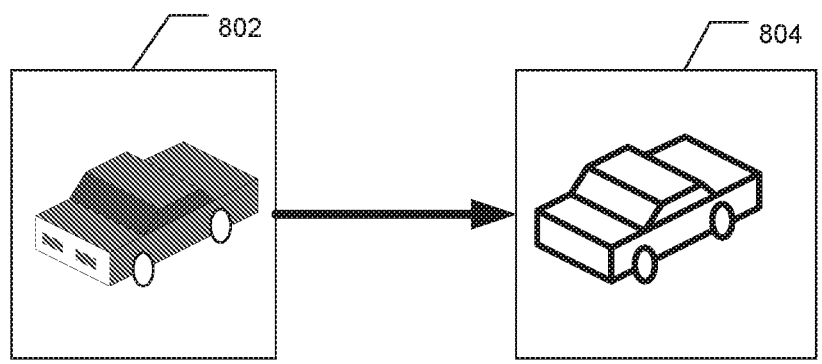
FIGS. 8 and 9 are diagrams depicting a method of identifying an item depicted in an image based on comparisons with other images, in accordance with an illustrative embodiment.
Figure 9:
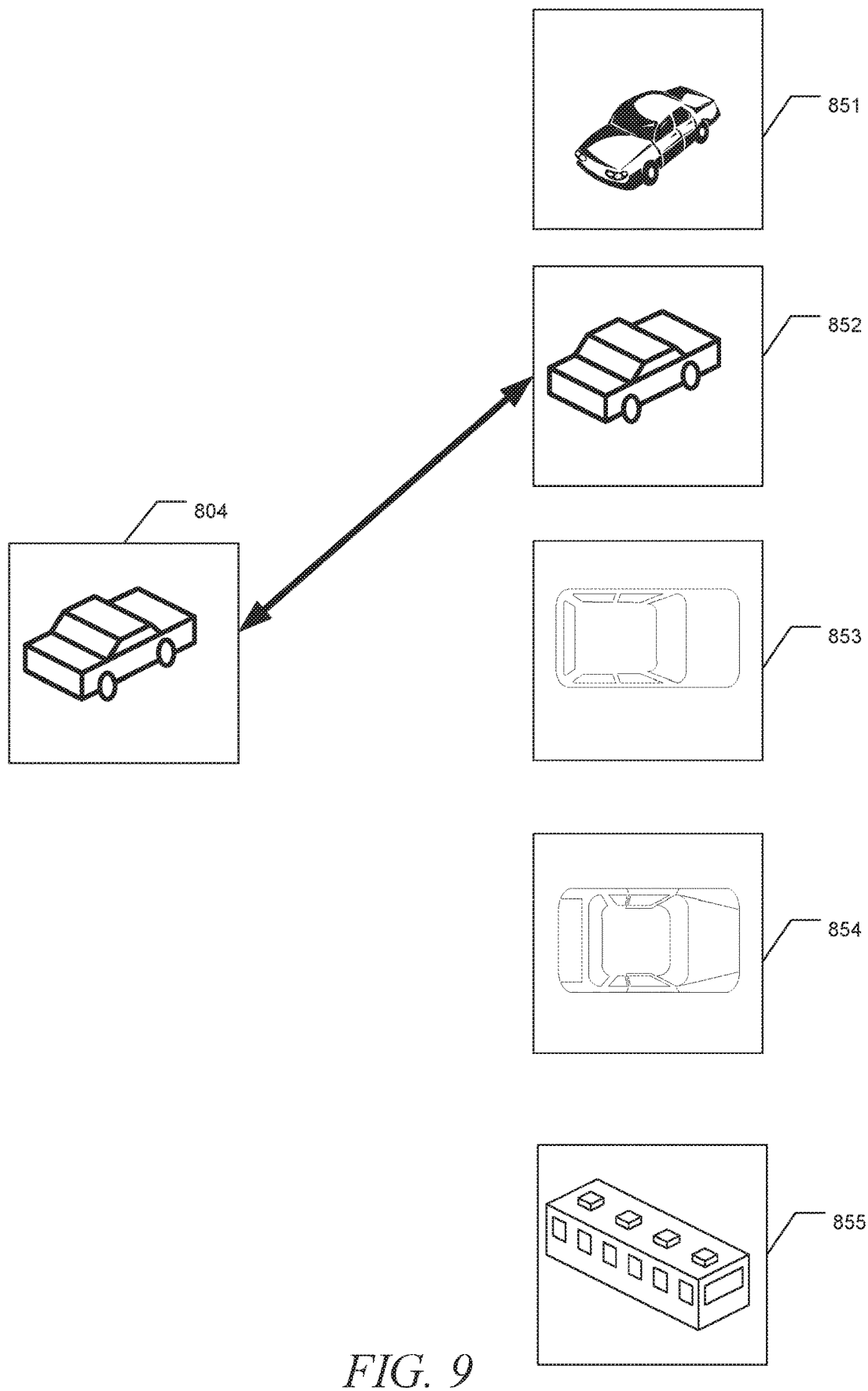

FIGS. 8 and 9 are diagrams depicting a method of identifying an item depicted in an image based on comparisons with other images, in accordance with an illustrative embodiment. As depicted in FIG. 8, a user takes a picture of a car using his mobile phone and submits this picture, in the form of an image 802 to, for example, a listing service that sells cars. Alternatively, the user may take a video of the car and submit one or more frames from the video to the listing service.

An item recognition module hosted with the listing service receives a request to identify the car depicted in the image from the processing system (e.g., a mobile phone) used by the user. This item recognition module has the capability to identify the type of car depicted in the image 802 by identifying a match of the image 802 with at least one other image of a car. Before identification, an edge detection algorithm is applied to the image 802 to produce an image 804 that highlights the lines of the car depicted in the image 802.

As depicted in FIG. 9, a number of other images 851-855 of cars and their associated item data are accessed. In this embodiment, the item identifiers associated with the images 851-855 are not immediately available and instead, the item identifiers are derived from item data associated with the images 851-855. In an embodiment, the item recognition module accesses the item data associated with one or more images 851-855 and then parses the item data to identify one or more item identifiers, which, for example, a user may define as a title or barcode value of an item.

The image 804 thereafter is compared with one or more images 851-855, which may, for example, be extracted from previous listings of cars. In this example, the image 804 is compared with each image 851, 852, 853, 854, and 855 and, for example, a statistical difference between each pair of images (e.g., 804 and 851 or 804 and 852) is generated for each comparison. In the example of FIG. 8b, the comparison of the image 804 with the image 852 yields the lowest statistical difference. As a result, a match of the image 804 with the image 852 is identified.

The item identifier associated with the image 852, which is identified from a parsing of the item data, is then associated with the image 802. The item recognition module then transmits the item identifier along with other requested item data (e.g., model and make) in a response to the earlier request back to the processing system used by the user. With a match, the listing service can also automatically place the listing of the car in an appropriate category and then list the car with its image 802 for sale on the website.

Figure 10:
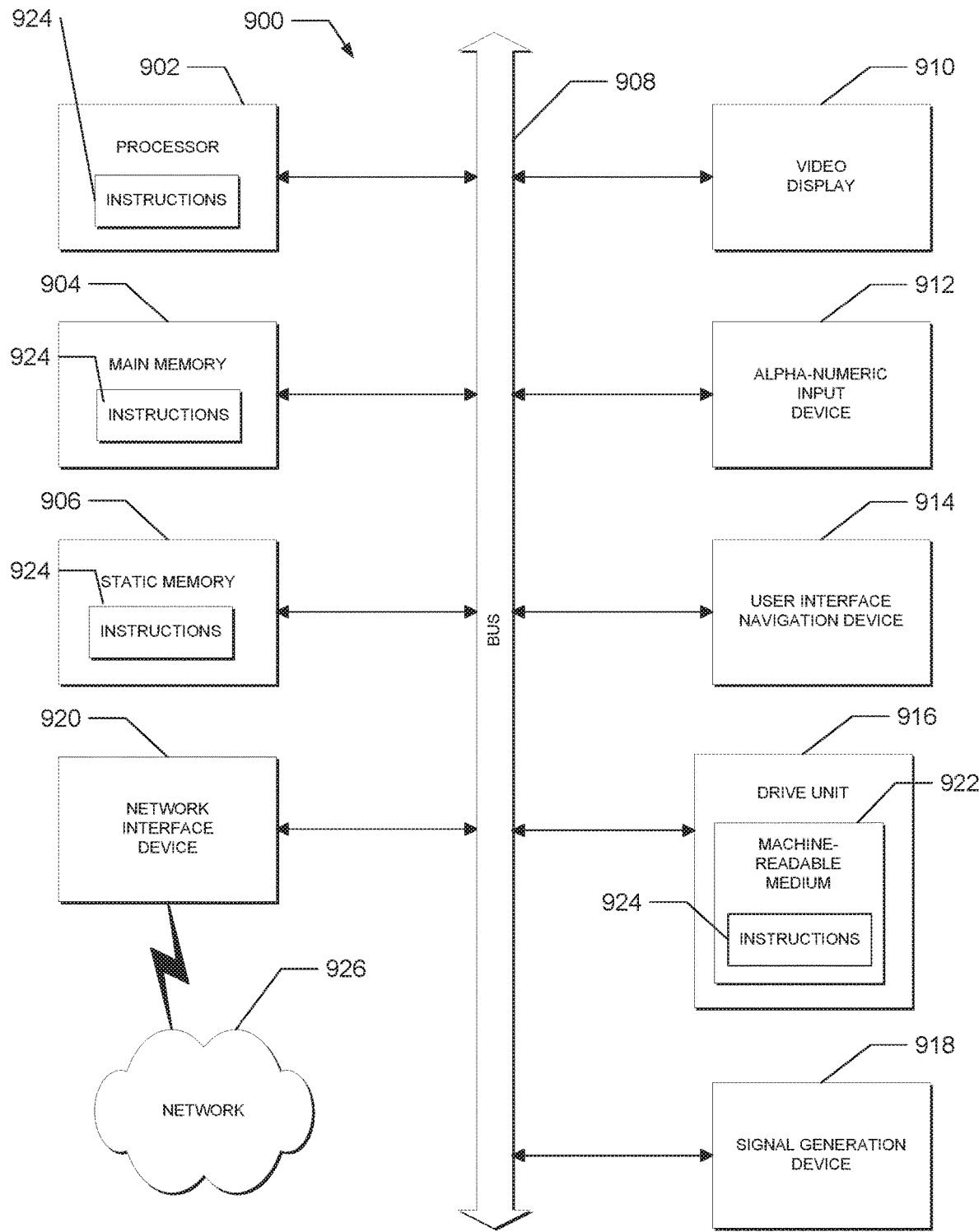
FIG. 10 is a block diagram depicting a machine in the example form of a processing system within which a set of instructions, for causing the machine to perform any one or more of the methodologies discussed herein, may be executed.

FIG. 10 is a block diagram of a machine in the example form of a processing system 900 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Embodiments may also, for example, be deployed by Software-as-a-Service (SaaS), Application Service Provider (ASP), or utility computing providers, in addition to being sold or licensed via traditional channels.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example processing system 900 includes a processor 902 (e.g., a central processing unit (CPU), a graphics processing unit (GPU) or both), a main memory 904, and static memory 906, which communicate with each other via bus 908. The processing system 900 may further include video display unit 910 (e.g., a plasma display, a liquid crystal display (LCD) or a cathode ray tube (CRT)). The processing system 900 also includes an alphanumeric input device 912 (e.g., a keyboard), a user interface (UI) navigation device 914 (e.g., a mouse), a disk drive unit 916, signal generation device 918 (e.g., a speaker), and network interface device 920.

The disk drive unit 916 includes machine-readable medium 922 on which is stored one or more sets of instructions and data structures 924 (e.g., software) embodying or utilized by any one or more of the methodologies or functions described herein. The instructions and data structures 924 may also reside, completely or at least partially, within main memory 904 and/or within processor 902 during execution thereof by processing system 900, main memory 904, and processor 902 also constituting machine-readable, tangible media.

The instructions and data structures 924 may further be transmitted or received over network 926 via network interface device 920 utilizing any one of a number of well-known transfer protocols (e.g., HTTP).

While the invention(s) is (are) described with reference to various implementations and exploitations, it will be understood that these embodiments are illustrative and that the scope of the invention(s) is not limited to them. In general, techniques for identifying items depicted in images may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

What is claimed is:

1. A method comprising:
   receiving a request to sell an item, the request including a first image of the item;
   determining, for a plurality of other images, a respective difference between a first color histogram of the first image and a plurality of second color histograms of one or more images of the plurality of other images;
   selecting, by one or more processors, one of the second color histograms most similar to the first color histogram based on the respective differences;
   identifying, by one or more processors, a second image of the plurality of other images that is associated with the selected second color histogram, the second image included in an item listing, the item listing further including an item description;
   determining an identifier associated with the identified second image;
   identifying a template based on the identifier; and
   transmitting the template to a client device based on identifying the template and in response to receiving the request to sell the item.

2. The method of claim 1, further comprising determining a statistical difference between the first color histogram and one or more color histograms from the plurality of second color histograms, wherein the selected second color histogram is selected based upon the statistical difference.

3. The method of claim 2, wherein the statistical difference is determined using a neural network.

4. The method of claim 1, further comprising determining a statistical similarity between the first color histogram and one or more color histograms from the plurality of second color histograms.

5. The method of claim 4, wherein the statistical similarity is determined using a neural network.

6. The method of claim 5, wherein the selected second color histogram is selected based upon the statistical similarity.

7. The method of claim 6, wherein the selected second color histogram has a highest statistical similarity with the first color histogram.

8. A system comprising:
   at least one processor; and
   memory storing computer executable instructions that, when executed by the at least one processor, cause the system to perform operations comprising:
      receiving a request to sell an item, the request including a first image of the item;
      determining, for a plurality of other images, a respective difference between a first color histogram of the first image and a plurality of second color histograms of one or more images of the plurality of other images;
      selecting one of the second color histograms most similar to the first color histogram based on the respective differences;
      identifying a second image of the plurality of other images that is associated with the selected second color histogram, the second image included in an item listing, the item listing further including an item description;
      determining an identifier associated with the identified second image;
      identifying a template based on the identifier; and
      transmitting the template to a client device based on identifying the template and in response to receiving the request to sell the item.

9. The system of claim 8, wherein the operations further comprise determining a statistical difference between the first color histogram and one or more color histograms from the plurality of second color histograms.

10. The system of claim 9, wherein the statistical difference is determined using a neural network.

11. The system of claim 10, wherein the selected second color histogram is selected based upon the statistical difference.

12. The system of claim 11, wherein the selected second color histogram has a lowest statistical difference with the first color histogram.

13. The system of claim 8, wherein the operations further comprise determining a statistical similarity between the first color histogram and one or more color histograms from the plurality of second color histograms.

14. The system of claim 13, wherein the statistical similarity is determined using a neural network.

15. The system of claim 14, wherein the selected second color histogram is selected based upon the statistical similarity.

16. The system of claim 15, wherein the selected second color histogram has a highest statistical similarity with the first color histogram.

17. A non-transitory machine-readable medium storing instructions that, when executed by one or more processors, cause a system to perform operations comprising:
   receiving a request to sell an item, the request including a first image of the item;

determining, for a plurality of other images, a respective difference between a first color histogram of the first image and a plurality of second color histograms of one or more images of the plurality of other images;

selecting one of the second color histograms most similar to the first color histogram based on the respective differences;

identifying a second image of the plurality of other images that is associated with the selected second color histogram, the second image included in an item listing, the item listing further including an item description;

determining an identifier associated with the identified second image;

identifying a template based on the identifier; and transmitting the template to a client device based on identifying the template and in response to receiving the request to sell the item.

18. The non-transitory machine-readable medium of claim 17, wherein the operations further comprise determining a statistical difference between the first color histogram and one or more color histograms from the plurality of second color histograms, wherein the selected second color histogram is selected based upon the statistical difference.

19. The non-transitory machine-readable medium of claim 18, wherein the statistical difference is determined using a neural network.

20. The non-transitory machine-readable medium of claim 17, wherein the operations further comprise determining a statistical similarity between the first color histogram and one or more color histograms from the plurality of second color histograms, wherein the selected second color histogram is selected based upon the statistical similarity.

* * * * *